United States Patent
Riggs

(10) Patent No.: US 9,165,593 B2
(45) Date of Patent: *Oct. 20, 2015

(54) VEHICLE REMOTE CONTROL INTERFACE FOR CONTROLLING MULTIPLE ELECTRONIC DEVICES

(75) Inventor: Brett D. Riggs, Yorba Linda, CA (US)

(73) Assignee: AAMP of Florida, Inc., Clearwater, FL (US)

( * ) Notice: Subject to any disclaimer, the term of this patent is extended or adjusted under 35 U.S.C. 154(b) by 629 days.

This patent is subject to a terminal disclaimer.

(21) Appl. No.: 13/616,498

(22) Filed: Sep. 14, 2012

(65) Prior Publication Data
US 2013/0039511 A1    Feb. 14, 2013

Related U.S. Application Data

(60) Continuation of application No. 11/414,812, filed on May 1, 2006, now Pat. No. 8,284,950, and a division of application No. 10/173,449, filed on Jun. 14, 2002, now Pat. No. 7,684,570, which is a
(Continued)

(51) Int. Cl.
*H04B 1/00*    (2006.01)
*G11B 19/02*    (2006.01)
(Continued)

(52) U.S. Cl.
CPC ............ *G11B 19/027* (2013.01); *H04B 1/202* (2013.01); *H04N 21/41422* (2013.01); *H04N 21/42204* (2013.01); *H04B 1/082* (2013.01); *H04R 2499/13* (2013.01)

(58) Field of Classification Search
CPC ................ H04R 5/02; H04R 2499/13; H04N 21/41422; H04N 21/42204; H04B 1/082; H04B 1/027; B60R 11/0217; G11B 19/027

USPC ............... 381/86, 302, 389, 77, 79; 455/345, 455/352.3; 700/94; 710/62–65
See application file for complete search history.

(56) References Cited

U.S. PATENT DOCUMENTS 2,133,151 A    10/1938    Rittenhouse
2,926,240 A    2/1960    Gollub
(Continued)

FOREIGN PATENT DOCUMENTS

EP    651119    11/1996

OTHER PUBLICATIONS

"Soundgate Dealers," Apr. 29, 1998.
(Continued)

*Primary Examiner* — Xu Mei
(74) *Attorney, Agent, or Firm* — Weiss & Arons LLP

(57) ABSTRACT

Systems and methods for controlling both an existing entertainment device and an aftermarket entertainment device in a vehicle with a user interface are provided. A method comprises adapting the user interface to selectively send control signals to the aftermarket entertainment device, sending control signals from the user interface to the existing entertainment device in response to user manipulation of the user interface, detecting whether the user has selected the aftermarket entertainment device; and sending control signals from the user interface to the aftermarket entertainment device in response to user selection of the aftermarket entertainment device and user manipulation of the user interface. The user interface may store output signals corresponding to the aftermarket entertainment device. Subsequent activation of the user interface may recall an output signal corresponding to the aftermarket entertainment device. The user interface can be adapted for use with a plurality of different types of aftermarket entertainment devices.

17 Claims, 13 Drawing Sheets

Related U.S. Application Data continuation-in-part of application No. 09/552,981, filed on Apr. 21, 2000, now Pat. No. 7,020,289, which is a continuation-in-part of application No. 09/442,627, filed on Nov. 17, 1999, now Pat. No. 6,956,952.

(60) Provisional application No. 60/108,711, filed on Nov. 17, 1998.

(51) Int. Cl.
   *H04B 1/20* (2006.01)
   *H04N 21/414* (2011.01)
   *H04N 21/422* (2011.01)
   *H04B 1/08* (2006.01)

(56) References Cited

U.S. PATENT DOCUMENTS

| | | | |
|---|---|---|---|
| 2,941,173 A | 6/1960 | Gollub |
| 2,973,431 A | 2/1961 | Sontheimer |
| 3,099,797 A | 7/1963 | Piccinini |
| 3,544,901 A | 12/1970 | Wood |
| 4,194,155 A | 3/1980 | Hirai et al. |
| 4,291,411 A | 9/1981 | Muller et al. |
| 4,362,907 A | 12/1982 | Polacsek |
| 4,455,454 A | 6/1984 | Umebayashi |
| 4,501,013 A | 2/1985 | Sato |
| 4,503,513 A | 3/1985 | Pogue, Jr. |
| 4,551,714 A | 11/1985 | Giammarese |
| 4,602,358 A | 7/1986 | Sato |
| 4,626,848 A | 12/1986 | Ehlers |
| 4,792,783 A | 12/1988 | Burgess et al. |
| 5,319,803 A | 6/1994 | Allen |
| 5,339,262 A | 8/1994 | Rostoker et al. |
| 5,339,362 A | 8/1994 | Harris |
| 5,515,052 A | 5/1996 | Darbee |
| 5,515,345 A | 5/1996 | Barreira et al. |
| 5,555,502 A | 9/1996 | Opel |
| 5,559,499 A | 9/1996 | Haubner |
| 5,691,710 A | 11/1997 | Pietraszak et al. |
| 5,709,065 A | 1/1998 | Krause |
| 5,781,123 A | 7/1998 | Koenig et al. |
| 5,790,481 A | 8/1998 | Meitner |
| 5,841,390 A | 11/1998 | Tsui |
| 5,903,259 A | 5/1999 | Brusky et al. |
| 5,903,481 A | 5/1999 | Kondo et al. |
| 5,949,149 A | 9/1999 | Shitanaka et al. |
| 5,950,166 A | 9/1999 | Hab-Umbach et al. |
| 5,999,104 A | 12/1999 | Symanow et al. |
| 5,999,996 A | 12/1999 | Dunn |
| 6,097,520 A | 8/2000 | Kadnier |
| 6,107,951 A | 8/2000 | Katayama et al. |
| 6,114,970 A | 9/2000 | Kirson et al. |
| 6,119,088 A | 9/2000 | Ciluffo |
| 6,396,164 B1 | 5/2002 | Barnea et al. |
| 6,397,186 B1 | 5/2002 | Bush et al. |
| 7,020,289 B1 | 3/2006 | Riggs |
| 7,684,570 B2 | 3/2010 | Riggs |
| 2003/0007649 A1 | 1/2003 | Riggs |
| 2005/0249358 A1 | 11/2005 | Riggs |
| 2006/0198535 A1 | 9/2006 | Riggs |

OTHER PUBLICATIONS

"Soundgate #FRDSW2," Oct. 10, 1998.
"Announcing . . . The SoundGate Steering Wheel Control Interface of Alpine Receivers," Sep. 10, 1999.
"GMSW 1, and SWC2 thru SWC9 Installation Instructions," 1997.
Weeder, Terry J., "Remote Control Adapter," Gernsback Publications, Inc., vol. 66, No. 8, Aug. 1995, Farmingdale, New York.
Weeder, Terry J., "IR Remote Decoder," T & L Publications, Inc., vol. 19, No. 2, Feb. 1998, Corona, California.
"Peripheral—Steering Wheel Interface, Model PESWI-2.—Programming Instructions (online)," Peripheral Electronics, A Division of AAMP of America, Mar. 23, 2001, (retrieved on Feb. 18, 2005), Clearwater, Florida.

"*AAMP of Florida, Inc., d.b.a. AAMP of America* V. *Automotive Data Solutions Inc.*,—Defendant Automotive Data solutions, Inc.'s Answer and CounterClaims" United States District Court Middle District of Florida Tampa Division, Case No. 8:13-cv-02019-MSS-TGW, Filed on Jan. 9, 2014.
"*Audionics System, Inc., d.b.a. Crux Interfacing Solutions*, a California company V. *AAMP of Florida Inc., d.b.a. AAMP of America, Inc.*, a Florida company—Memorandum of Points and Authorities in Support of Plaintiff's Motion for Summary Judgment of Invalidity of U.S. Pat. Nos. 8,014,540 and 8,184,825," United States District Court Central District of California, Case No. 2:12-cv-10763-MMM-JEM, Filed on Nov. 18, 2013.
"*Audionics System, Inc., d.b.a. Crux Interfacing Solutions*, a California company V. *AAMP of Florida Inc., d.b.a. AAMP of America, Inc.*, a Florida company—Order Granting AAMP of Florida, Inc.'s Motion to Strike Audionics System, Inc.'s Affirmative Defenses," United States District Court Central District of California, Case No. CV 12-10763 MMM (JEMx), Filed on Nov. 19, 2013.
"*Audionics System, Inc., d.b.a. Crux Interfacing Solutions*, a California company V. *AAMP of Florida Inc., d.b.a. AAMP of America, Inc.*, a Florida company—AAMP's Opposition to Plaintiff's Motion for Summary Judgment of Invalidity of U.S. Pat. Nos. 8,014,540 and 8,184,825," United States District Court Central District of California Western Division, Case No. 2:12-cv-10763-MMM-JEM, Dec. 16, 2013.
*Audionics System, Inc., d.b.a. Crux Interfacing Solutions*, a California company V. *AAMP of Florida Inc., d.b.a. AAMP of America, Inc.*, a Florida company—Reply in Support of Plaintiff's Motion for Summary Judgment of Invalidity of U.S. Pat. Nos. 8,014,540 and 8,184,825, United States District Court Central District of California, Case No. 2:12-cv-10763-MMM-JEM, Filed on Dec. 10, 2013.
"*Audionics System, Inc., d.b.a. Crux Interfacing Solutions*, a California company V. *AAMP of Florida Inc., d.b.a. AAMP of America, Inc.*, a Florida company—Certificate of Service of Expert Report of Robert Leale," United States District Court Central District of California Western Division, Case No. 2:12-cv-10763-MMM-JEM, Jun. 7, 2013.
"*Audionics System, Inc., d.b.a. Crux Interfacing Solutions*, a California company V. *AAMP of Florida Inc., d.b.a. AAMP of America, Inc.*, a Florida company—Order Granting in Part and Denying in Part AAMP of Florida, Inc.'s Motion to Strike Audionics System, Inc.'s Inequitable Conduct Defense," United States District Court Central District of California, Case No. CV 12-10763 MMM (JEMx), Filed on Mar. 24, 2014.
"*Audionics System, Inc., d.b.a. Crux Interfacing Solutions*, a California company V. *AAMP of Florida Inc., d.b.a. AAMP of America, Inc.*, a Florida company—Audionics System, Inc.'s Third Amended Answer and Affirmative Defenses to AAMP of Florida, Incs.'s Complaint for Infringement of U.S. Pat. Nos. 8,014,540 and 8,184,825," United States District Court Central District of California, Case No. CV 12-10763 MMM (JEMx), Filed on Apr. 10, 2014.
"*Audionics System, Inc., d.b.a. Crux Interfacing Solutions*, a California company V. *AAMP of Florida Inc., d.b.a. AAMP of America, Inc.*, a Florida company—Claim Construction Order," United States District Court Central District of California, Case No. CV 12-10763 MMM (JEMx), Filed on Sep. 12, 2013.
"*AAMP of Florida, Inc., d.b.a. AAMP of America* V. *Automotive Data Solutions Inc.*,—Defendant Automotive Data Solutions, Inc.'s Opposition to Plaintiff AAMP of Florida, Inc.'s Motion to Strike and to Dismiss Defendant's Inequitable Conduct Defense," United States District Court Middle District of Florida Tampa Division, Case No. 8:13-cv-02019-MSS-TGW, Filed on Feb. 20, 2014.
"*Audionics System, Inc., d.b.a. Crux Interfacing Solutions*, a California company V. *AAMP of Florida Inc., d.b.a. AAMP of America, Inc.*, a Florida company—Expert Report of Robert Zeidman," United States District Court Central District of California, Case No. CV 12-10763-MMM (JEMx), Filed on May 23, 2013.
"*AAMP of Florida, Inc., d.b.a. AAMP of America* V. *Automotive Data Solutions Inc.*,—Plaintiff AAMP of Florida, Inc.'s Motion to Strike and to Dismiss and Incorporated Memorandum of Law," United

(56) References Cited

OTHER PUBLICATIONS

States District Court Middle District of Florida Tampa Division, Case No. 8:13-cv-02019-MSS-TGW, Filed on Feb. 3, 2014.
"*Audionics System, Inc., d.b.a. Crux Interfacing Solutions*, a California company V. *AAMP of Florida Inc., d.b.a. AAMP of America, Inc.*, a Florida company—Deposition of Brett Riggs," United States District Court Central District of California Western Division , Case No. CV 12-10763-MMM (JEMx), Jul. 31, 2013.
"*Audionics System, Inc., d.b.a. Crux Interfacing Solutions*, a California company V. *AAMP of Florida Inc., d.b.a. AAMP of America, Inc.*, a Florida company—The Videotaped Deposition of Terry Weeder," United States District Court Central District of California , Case No. CV 12-10763-MMM, Nov. 8, 2013.
"*Audionics System, Inc., d.b.a. Crux Interfacing Solutions*, a California company V. *AAMP of Florida Inc., d.b.a. AAMP of America, Inc.*, a Florida company—Supplemental Expert Report of Robert Zeidman Regarding: Invalidity," United States District Court Central District of California , Case No. CV 12-10763-MMM (JEMx), Apr. 4, 2014.

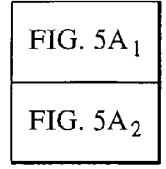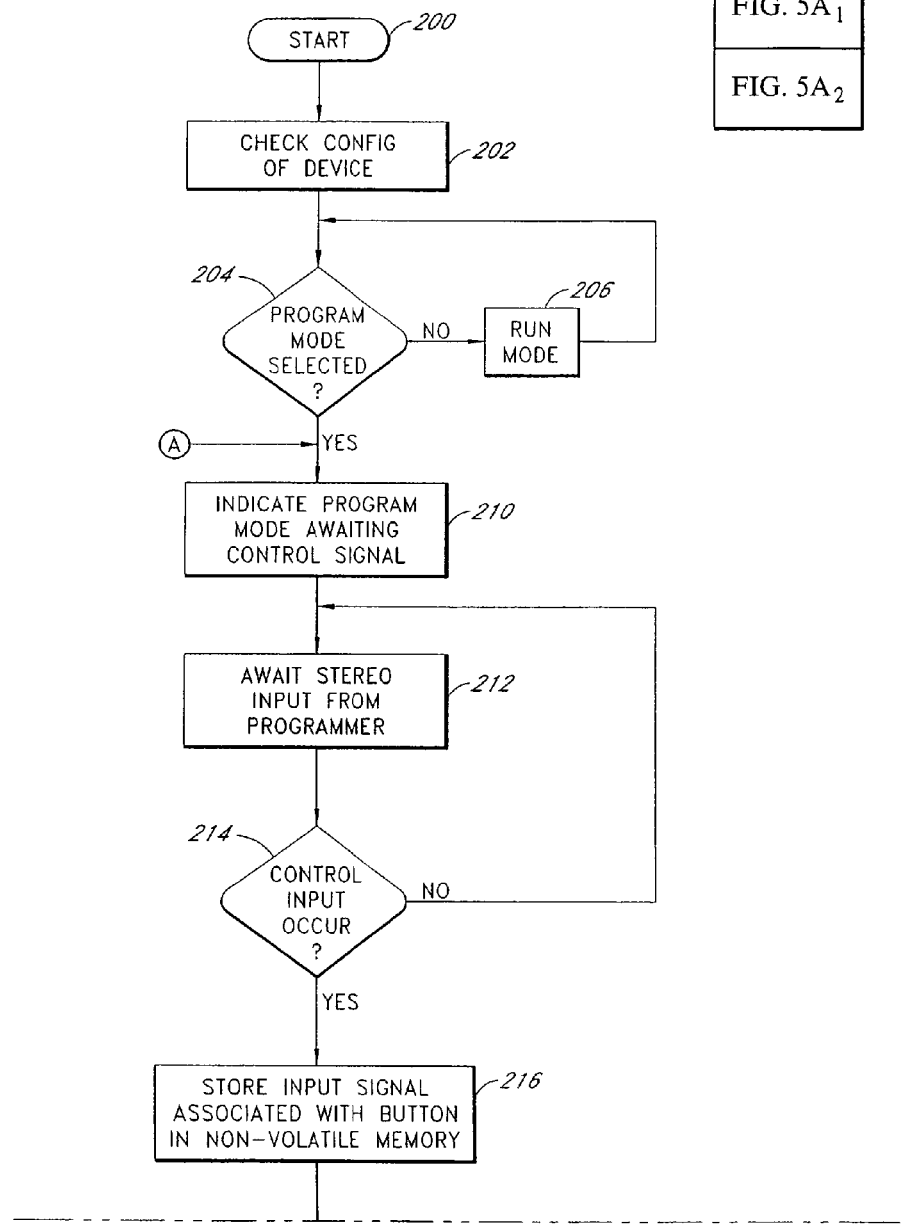

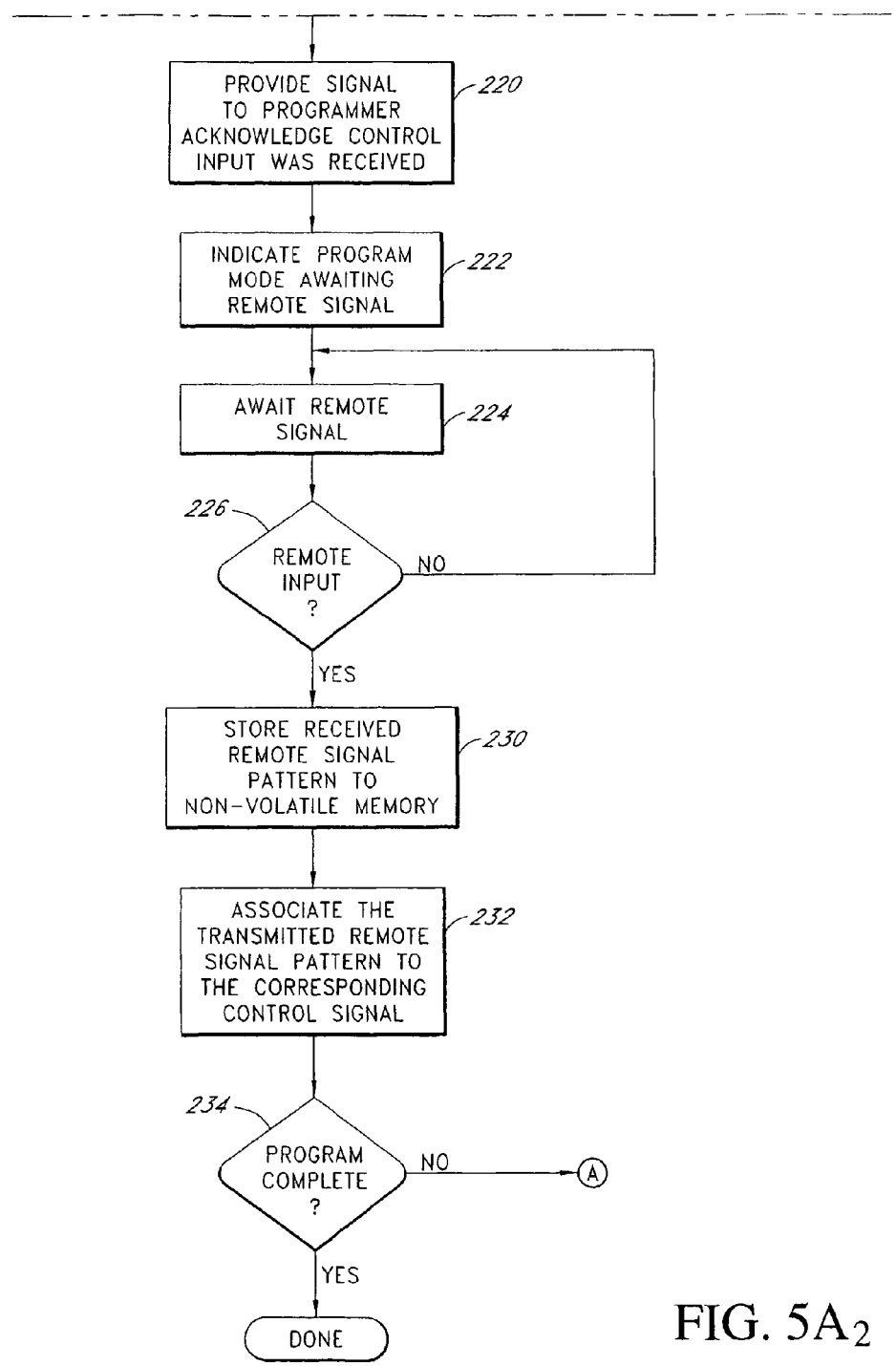
FIG. 5A₂

VEHICLE REMOTE CONTROL INTERFACE FOR CONTROLLING MULTIPLE ELECTRONIC DEVICES

This application is a continuation of U.S. patent application Ser. No. 11/414,812 filed May 1, 2006 (now U.S. Pat. No. 8,284,950) which is a divisional of U.S. patent application Ser. No. 10/173,449 filed Jun. 14, 2002 which is a continuation-in-part application of U.S. patent application Ser. No. 09/552,981 filed Apr. 21, 2000 (now U.S. Pat. No. 7,020,289) which was a continuation-in-part application of U.S. patent application Ser. No. 09/442,627, filed Nov. 17, 1999 (now U.S. Pat. No. 6,956,952) and claims the benefit of U.S. Provisional Application No. 60/108,711, filed on Nov. 17, 1998 which are hereby incorporated by reference herein in their entireties.

BACKGROUND OF THE INVENTION

1. Field of the Invention

The present invention relates to motor vehicle accessories and, in particular, concerns a remote control interface that is configured to manage, control, and operate a plurality of audio and/or video components.

2. Description of the Related Art

Motor vehicles, such as automobiles, recreational vehicles, boats, and motorcycles, are often equipped with a factory-installed entertainment system prior to shipment. Factory-installed entertainment systems include audio and/or video components, such as stereos, video cassette players, compact disc (CD) players, digital video disc (DVD) players, television receivers, satellite receivers, and traditional radio receivers. Over time, motor vehicles have been equipped with increasingly more sophisticated entertainment systems that tend to provide increased sound performance, increased visual performance, and more operational features, such as ease of access and use.

Typically, the electronic system control (ESC) devices for the above-mentioned entertainment systems are positioned adjacent the driver's seat of the motor vehicle in a manner such that the driver may easily access and operate the control devices while driving the motor vehicle. Unfortunately, even though the control devices are typically positioned somewhat adjacent the driver's seat, the control devices are generally not within the driver's field of view. Often, the driver is required to look at the control devices and remove at least one hand from the steering wheel or steering control mechanism of the motor vehicle to manipulate the control devices. This particular situation may create a potentially dangerous hazard, and, in some respects, numerous accidents have occurred as a result of the driver diverting attention away from safely operating the motor vehicle to accomplish some other task. Additionally, the typical location for the control devices may be relatively inaccessible to some of the passengers. For example, if the control devices are located adjacent the driver in the front seat of a passenger automobile, the passengers in the back seat may not be able to access the control devices to adjust the operation of the entertainment system. Therefore, the passengers usually ask the driver to adjust the electronic system control settings, which may further distract the driver from safely operating the motor vehicle.

To address these particular issues, motor vehicle manufacturers currently offer local electronic system control devices that are positioned in more favorable locations for the driver and/or the passenger(s) to access. For example, many current production automobiles incorporate local controls mounted on the steering wheel of the motor vehicle, wherein the local controls typically comprise push-button switches that allow the user to control a particular setting or operation of the entertainment system, such as volume adjustment, radio channel reception settings, or playing format adjustments. Similarly, motor vehicles may also incorporate local electronic system controls that are easily accessed by the passengers. For example, some larger vehicles incorporate and position electronic system control buttons adjacent the backseat passenger location in a manner such that the passengers may adjust the operation of the entertainment system. As a result, these types of local controls may reduce the likelihood that the driver's attention will be diverted away from the path of travel of the motor vehicle or from the safe operation of the motor vehicle.

Unfortunately, even though the above-mentioned local electronic system control devices may improve the flexibility of adjusting the operation of the entertainment system, the local control devices are generally rendered inoperable when the factory-installed entertainment system is replaced with an after-market entertainment system. In one aspect, the owner of a motor vehicle may become dissatisfied with the factory-installed entertainment system, and the owner may choose to replace the factory-installed entertainment system with a different after-market entertainment system.

Typically, replacement entertainment systems are of higher quality and offer greater and/or different performance characteristics than factory-installed entertainment systems. In addition, after-market entertainment systems are typically less expensive than comparable factory-installed entertainment systems and offer a more economical replacement in case the original entertainment system is stolen or damaged.

Unfortunately, installing an after-market entertainment system may render the local electronic system control buttons inoperable. Typically, the local control devices are connected to the original entertainment system via a hardwired assembly that is specifically designed to connect the local control devices to the particular factory-installed entertainment system. As a result, the replacement entertainment system may not be properly configured to readily connect or easily interface with the hardwired local control devices.

One possible solution to the above-mentioned problem is to provide a handheld wireless remote control device along with the replacement entertainment system. For example, the replacement entertainment system may be adapted to receive wireless control signals from the handheld remote control device in a manner such that the person holding the handheld remote control device may then control the operation of the replacement entertainment system without touching the controls on the front face of the entertainment system. Although a handheld remote control device may allow for people positioned remotely from the entertainment system to control the operation of the replacement entertainment system, the handheld remote control devices are generally unsatisfactory for many motor vehicle drivers and passengers.

In particular, the handheld remote control device may be easily misplaced, lost, or not readily accessible to the occupants of the motor vehicle while the motor vehicle is in operation. Moreover, the handheld remote control device often requires the occupants of the motor vehicle to specifically point the device in the direction of the replacement entertainment system wireless receiver in a manner such that the wireless receiver may receive the appropriate wireless signal to adjust the operation of the entertainment system.

If the driver of the motor vehicle is using the remote control, the driver may have to divert attention away from the path of travel of the vehicle and the operation of the vehicle, locate the appropriate control buttons on the handheld remote control, and then point the handheld remote control in the direction of the entertainment system receiver. Therefore, while the above-described handheld remote control device may allow for the remote control of a replacement entertainment system, the remote control device may not provide the desirable convenience of utilizing local control devices positioned in the motor vehicle that are adapted to be used in conjunction with the factory-installed entertainment system.

Conventional factory-installed control devices are typically configured to only operate and control one factory-installed device. Additional after-market control devices usually require their own remote controller for operation and control. Therefore, the user would have to operate multiple control devices with more than one controller. For the driver, this situation is inconvenient and further diverts attention away from operating the motor vehicle.

Recent advances in voice recognition technology and motor vehicle quieting have made it possible to implement voice activated controls in motor vehicles. In one aspect, the 2000 S Type Jaguar offers such a system as a factory option. A voice recognition system is able to recognize the sound pattern of a spoken word or phrase and enact a corresponding action, such as turning on high beams, locking a door, increasing the volume of a stereo, etc. However, as a factory installed feature, typical voice command systems suffer the same limitations as local electronic system controls, wherein the factory-installed features work well with the factory-supplied components but typically will not readily function with after-market equipment. Some replacement entertainment systems are available with included voice recognition features. However, these entertainment systems tend to be quite expensive and the voice recognition feature only works with that particular entertainment system.

From the foregoing, it should be appreciated that there is a need for an entertainment system that allows for existing local control devices to be utilized in conjunction with a replacement entertainment system. In addition, there is a need for a local electronic system control device that may be adapted to interface with an existing factory-installed hardwired control network. Furthermore, there is also a need for a method to economically retrofit a voice recognition system to effectively control a variety of after-market entertainment systems. Furthermore, there is a need for an ESC device that will allow the user to control multiple entertainment devices with the same set of local controls.

SUMMARY OF THE INVENTION

The aforementioned needs are satisfied by the multi-unit interface system described hereinbelow. In one aspect the multi-unit interface comprises at least two electronic devices, at least one control located remotely from the at least two electronic devices, and a remote interface circuit coupling the at least two electronic devices to the at least one control. As such, the remote interface circuit allows a user to alternatively control the at least two electronic devices. Advantageously, the user can conveniently control multiple electronic devices without having to reach for the actual electronic device.

This promotes convenience and safety because the driver will not have to remove a hand from the steering wheel in order to control the electronic device, and the driver is less likely to be distracted from driving when doing so. Also, passengers can likely stay in their seats when controlling the electronic units making it unlikely that the passengers would unbuckle their safety belt to control the electronic unit.

In one embodiment, the aforementioned needs may be satisfied by an electronic system for a vehicle, wherein the electronic system comprises at least one pre-existing entertainment component for the vehicle and a pre-existing user interface for the vehicle, wherein the pre-existing user interface controls the at least one pre-existing entertainment component in response to a first plurality of user activated inputs. In addition, the electronic system may further comprise at least one additional entertainment component added to the vehicle and a control interface added to the vehicle, wherein the control interface enables the pre-existing user interface to control the at least one additional entertainment component with the first plurality of user activated inputs.

In another embodiment, the aforementioned needs may be satisfied by an entertainment system for a vehicle, wherein the entertainment system comprises a first component positioned within the vehicle so as to provide a first plurality of entertainment signals to occupants within the vehicle and a second component positioned within the vehicle so as to provide a second plurality of entertainment signals to the occupants within the vehicle. Additionally, the entertainment system may further comprise a plurality of occupant activated switches positioned within the vehicle, wherein the occupant activated switches produce control signals in response to occupant activation that control the operation of the first component, and an interface device positioned within the vehicle that receives the control signals from the plurality of occupant activated switches, wherein the interface device can be activated by an occupant so as to use the control signals produced by the plurality of occupant activated switches to control the operation of the second component in response to the occupant selection of the second component.

In still another embodiment, the aforementioned needs may be satisfied by a method of controlling both an existing entertainment device and an additional entertainment device in a vehicle with a user interface originally configured to control the existing entertainment device, wherein the method comprises adapting the user interface to selectively send control signals to the additional entertainment device. In addition, the method may further comprise sending control signals from the user interface device to the existing entertainment device in response to user manipulation of the user interface device, detecting whether the user has selected the additional entertainment device, and sending control signals from the user interface device to the additional entertainment device in response to user selection of the additional entertainment device and user manipulation of the user interface. These and other objects and advantages of the present invention will become more fully apparent from the following description taken in conjunction with the accompanying drawings.

BRIEF DESCRIPTION OF THE DRAWINGS

These and other aspects, advantages, and novel features of the invention will become apparent upon reading the following detailed description and upon reference to the accompanying drawings. In the drawings, similar elements have similar reference numerals.

FIG. 5A is an exemplary flow chart illustrating the operation of a microcontroller of the remote stereo control interface device in a program mode;

DETAILED DESCRIPTION OF THE PREFERRED EMBODIMENT

Figure 1:
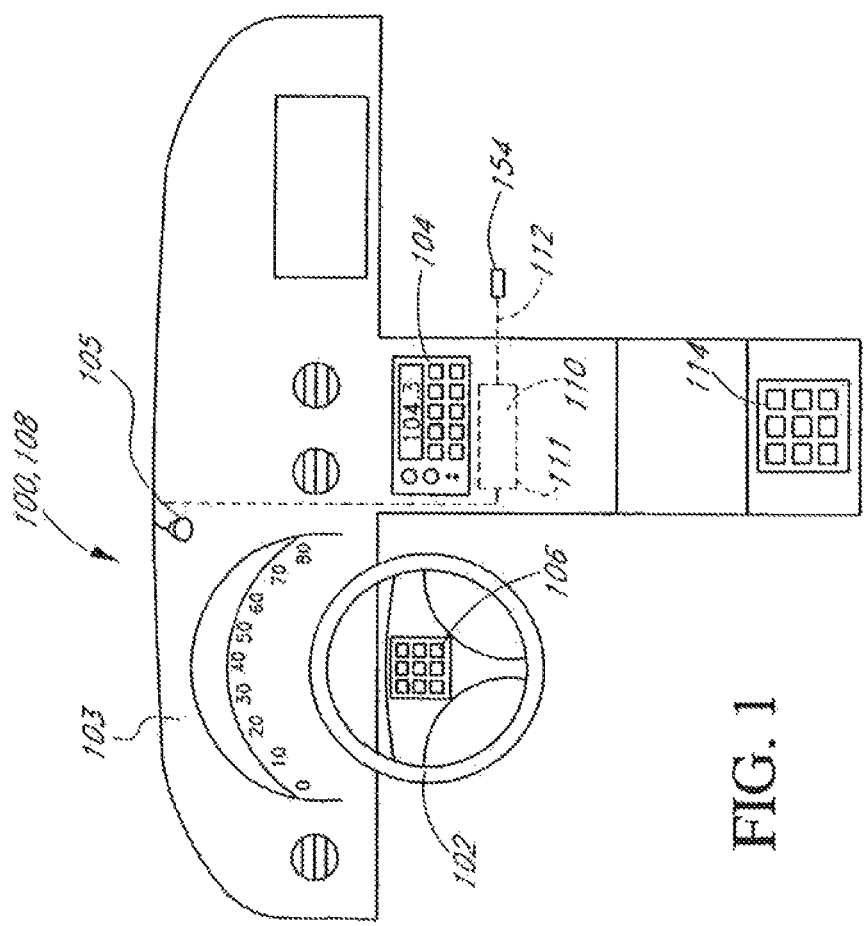
FIG. 1 is an isometric view of a typical vehicle dashboard incorporating local stereo control buttons located on a steering wheel of the dashboard and located adjacent the backseat and further including an interface device and a replacement stereo control unit or receiver.

Reference will now be made to the drawings wherein like numerals refer to like parts throughout. FIG. 1 illustrates a perspective view of an exemplary vehicle interior incorporating the components of a remote stereo control interface system 100. The remote stereo control interface system 100 is comprised of factory installed local stereo controls 106 generally located in the center hub of a typical vehicle steering wheel 102. The local stereo controls 106 are used for the driver to make selections to a replacement after-market in-dash stereo 104, wherein these selections may include AM/FM, seek, volume up, volume down, play, etc.

The advantage of making these desired selections with the local stereo controls 106 is to reduce the occurrence of the driver moving his or her eyes away from the road or hands away from the steering wheel 102 when making selections at the in-dash stereo 104. Hence, the local stereo controls 106 are installed in the factory to give the driver greater convenience in controlling the operation of the factory installed stereo while driving. These local stereo controls 106 are typically hardwired to the factory installed stereo receiver such that replacement of the factory installed stereo receiver typically disables the local stereo controls 106. However, as will be described in greater detail below, a remote interface circuit 110 is adapted to be connected to the existing local stereo controls 106 and communicate with a replacement in-dash stereo 104 that replaces the original stereo receiver such that the existing local stereo controls 106 can be used to control the operation of the replacement in-dash stereo 104.

In particular, the local stereo controls 106 are hardwired to the remote interface circuit 110 which is illustrated in phantom lines and is described in greater detail in reference to FIGS. 4A, 4B and 4C below. The remote interface circuit 110, in this embodiment, is positioned within a casing 111 that is rectangular in shape, approximately 4.0 inches long, 2.0 inches wide and 2.0 inches in height. As is illustrated in FIG. 1, the casing 111 is adapted to be mounted unobtrusively behind the dashboard 103 of the vehicle so as to be generally hidden from view. The remote interface circuit 110 is adapted to be connected to the local stereo controls 106 via the existing hardwiring of the vehicle and is also adapted to send signals to the replacement in-dash stereo 104 via a transmission cable 112. In this embodiment, the transmission cable 112 includes an output signal transmitter 154 (See, FIG. 3) that is located in line of sight of a remote signal receiver (not shown) on the after-market in-dash stereo 104. The transmission cable 112 is illustrated with phantom lines and is generally 4 feet in length and is located in the vehicle dashboard 103 such that the tip of the transmission cable 112 that is comprised of the output signal transmitter 154 is positioned generally within close proximity of the in-dash stereo 104.

Generally, the replacement in-dash stereo 104 is used in place of an original stereo receiver, such as the factory installed stereo receiver, that has been stolen or has become defective or out-of-date. It is fairly common that the replacement in-dash stereo 104 is lower in price and/or includes additional features over the original receiver. The replacement in-dash stereo 104 can be any of a number of after-market receivers, such as those manufactured by Panasonic, Clarion, Denon, Eclipse, JVC, Kenwood, Pioneer, Sony, etc. The typical after-market in-dash stereo 104 is equipped with a wireless receiver, such as an infrared (IR) receiver, that is adapted to receive wireless signals from a handheld remote control 160. This enables the driver to use a handheld remote control 160 to adjust the stereo's operation, e.g., change channels, volume, etc. As will be described in greater detail below, the remote interface circuit 110 is adapted to be programmed to produce wireless signals similar to those produced by the handheld remote control 160 that are recognizable by the after-market in-dash stereo 104 upon receipt of the corresponding signals from the local stereo controls 106.

The remote interface circuit 110 can also be adapted to connect with one or more alternative local stereo controls 114, illustrated in FIG. 1, wherein the alternative local controls 114 are positioned, in this embodiment, adjacent the rear seating area of the vehicle. The alternative local stereo controls 114 are shown in an exemplary location and it can be appreciated that the alternative local stereo controls 114 may be positioned almost anywhere in the vehicle suitable for remote function selection. These types of alternative local stereo controls 114 are typically positioned so that people sitting remotely from the in-dash stereo 104 can still control the basic functions of the in-dash stereo 104 such as changing the program, the channel, the volume, etc.

The remote interface circuit 110 is connected to the existing hardwiring of the alternative local stereo controls 114 and is then programmed to provide appropriate signals to the replacement in-dash stereo 104 so as to be able to provide commands to the replacement in-dash stereo 104 corresponding to the commands of the selected alternative local controls 114. Hence, the remote interface circuit 110 can be used to receive signals from alternative local stereo controls 114 located anywhere within a vehicle such that the alternative local stereo controls 114 can be used to control a replacement in-dash stereo 104.

Figure 2B:
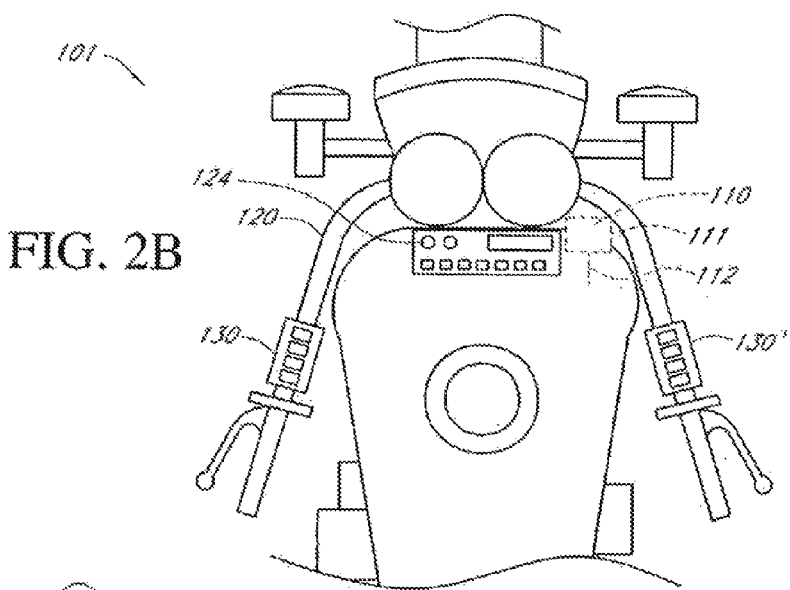
FIGS. 2A and 2B are top isometric illustrations of a motorcycle incorporating local stereo controls mounted on the handlebars of the motorcycle and an interface device that allows for the communication of signals from the local stereo controls to a replacement stereo receiver.
Figure 2A:
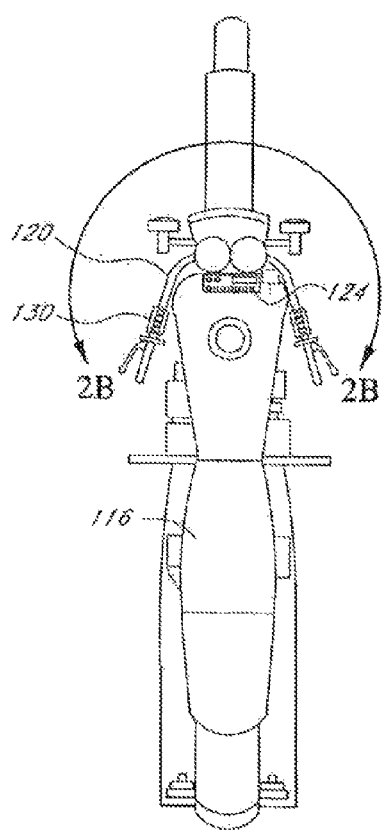

FIGS. 2A and 2B illustrate another embodiment of a remote stereo control interface system 101, substantially similar to the remote stereo control interface system 100 that is shown in FIG. 1. In particular, FIG. 2A illustrates a top view of a typical motorcycle 116 with handlebars 120 for steering. It is commonly known that expensive stereo systems are used on many high-end motorcycles 116. Oftentimes, the motorcycle 116 is equipped with handlebar stereo controls 130 positioned on the handlebars 120 so that the rider does not have to remove his or her hands from the handlebars 120 of the motorcycle 116 while changing radio channels, adjusting volume, adjusting play selection, and the like. However, these handlebar stereo controls 130 are also typically hardwired to the existing factory installed stereo receiver such that replacement of the factory installed stereo receiver often results in the handlebar stereo controls 130 being rendered inoperative.

The remote stereo control interface system 101 can be adapted to utilize the factory mounted handlebar stereo controls 130 with a replacement stereo receiver 124 by receiving the signals from the handlebar stereo controls 130 and transmitting a corresponding signal that is recognizable by the replacement stereo receiver 124 mounted on the motorcycle 116. In particular, the remote stereo control interface system 101 also includes the remote interface circuit 110 that is positioned within the casing 111 (shown in phantom) that is hardwired to the existing handlebar stereo controls 130. The remote interface circuit 110 includes the transmission cable 112 that is positioned so that the output signal transmitter 154 is positioned generally within close proximity of the replacement stereo receiver 124. As discussed above, the replacement stereo receiver 124 is preferably equipped to receive wireless signals, such as IR signals, from the output signal transmitter 154 to change or adjust the replacement stereo receiver 124 operation.

Figure 3:
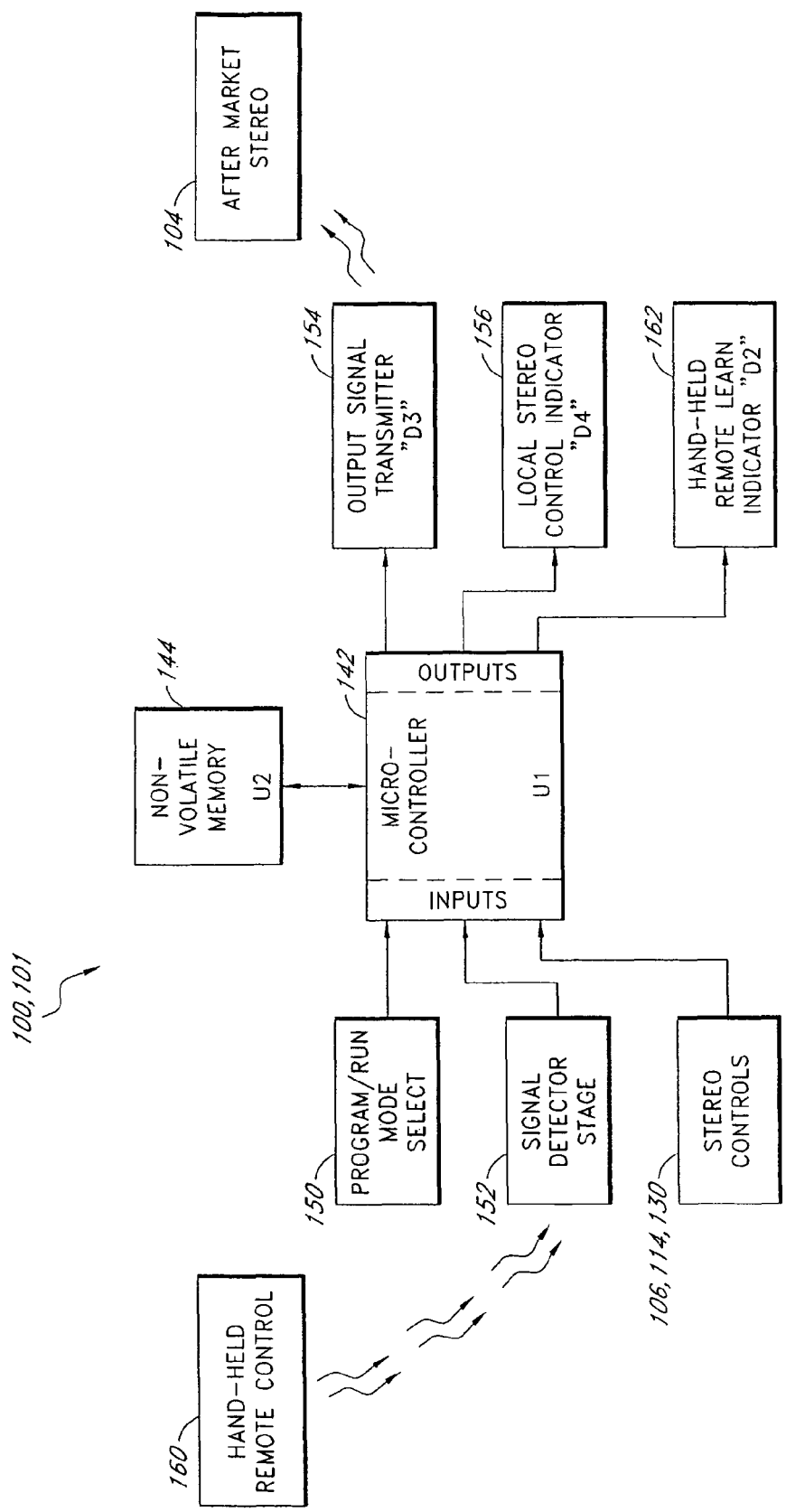
FIG. 3 is a schematic block diagram illustrating the basic configuration of the remote stereo control interface device of FIGS. 1 and 2.

FIG. 3 is a block diagram of the remote stereo control interface system 100 or 101 of the preferred embodiment. The remote stereo control interface system 100 or 101 incorporates a microcontroller 142 that is adapted to receive electrical signals from various switches, sensors and controls located in the vehicle for the purpose of controlling the replacement in-dash stereo 104. In particular the microcontroller 142 is adapted to receive a plurality of electrical signals from stereo controls, such as either the local stereo controls 106 or the alternative local stereo controls 114 of FIG. 1, or the handlebar stereo controls 130 of FIGS. 2A and 2B. The microcontroller 142 is also adapted to receive a signal from a detector stage 152 from the handheld remote control 160. As is well understood in the art, the detector stage 152 is adapted to receive and demodulate a wireless signal sent by a handheld remote control 160 for the in-dash stereo 104. As discussed above, the in-dash stereo 104 is preferably adapted to receive IR signals from a handheld remote control 160. As will be described in greater detail below, the microcontroller 142 is preferably adapted to be able to receive, from the handheld remote control 160, the wireless signal for controlling a particular stereo function, store this signal and then reproduce and broadcast this signal to the after-market in-dash stereo 104 when a driver or passenger in the vehicle activates a stereo control 106, 114 or 130 corresponding to the function of the stored signal.

The microcontroller 142, in this embodiment, also receives a signal from a program mode select switch 150 that is attached to the casing 111 of the remote interface circuit 110. The program mode select switch 150 when selected, instructs the microcontroller 142 to enter a program mode, allowing the microcontroller 142 to learn and record the specific control functions selected on the stereo controls 106, 114, 130 and the handheld remote control 160. These signals are stored in non-volatile memory 144 located on-board the remote interface circuit 110. It will be appreciated that the pre-selected specific control functions selected on the stereo controls 106, 114, 130 and the handheld remote control 160 will not be lost upon the removal of vehicle power when the ignition is switched off to the remote interface circuit 110 and the microcontroller 142. The microcontroller 142, when not in a program mode, may be in a run mode or an off state. A flowchart of the program mode and nm mode shall be discussed in reference to FIGS. 5A and 5B below.

The microcontroller 142 is also adapted to output electrical signals to various output and display devices. In particular, the microcontroller 142 communicates data and instructions to the stereo receiver 104 via an output signal transmitter 154 located at the tip of the transmission cable 112. During the run mode of operation, the output signal transmitter 154 in combination with the microcontroller 142 generates a carrier signal with modulated data and instruction information, wherein this information is transmitted to the after-market stereo receiver 104 for the purpose of wireless stereo function selection and modification.

Other output devices attached to the microcontroller 142 include a local stereo control indicator 156 and a handheld remote learn indicator 162. The local stereo control indicator 156, in this embodiment, is a light emitting diode (LED) and provides the programmer a visual indication of the status of the programmability of each stereo control 106, 114, 130 function in the manner that will be described in greater detail hereinbelow. Furthermore, the handheld remote learn indicator 162 is controlled by the microcontroller 142 and provides the programmer a visual indication of the status of the programmability of each corresponding handheld remote instruction transmitted by the handheld remote control 160. The function of the indicators 156, 162 will be described in greater detail in reference to FIGS. 5A and 5B hereinbelow.

Figure 4A:
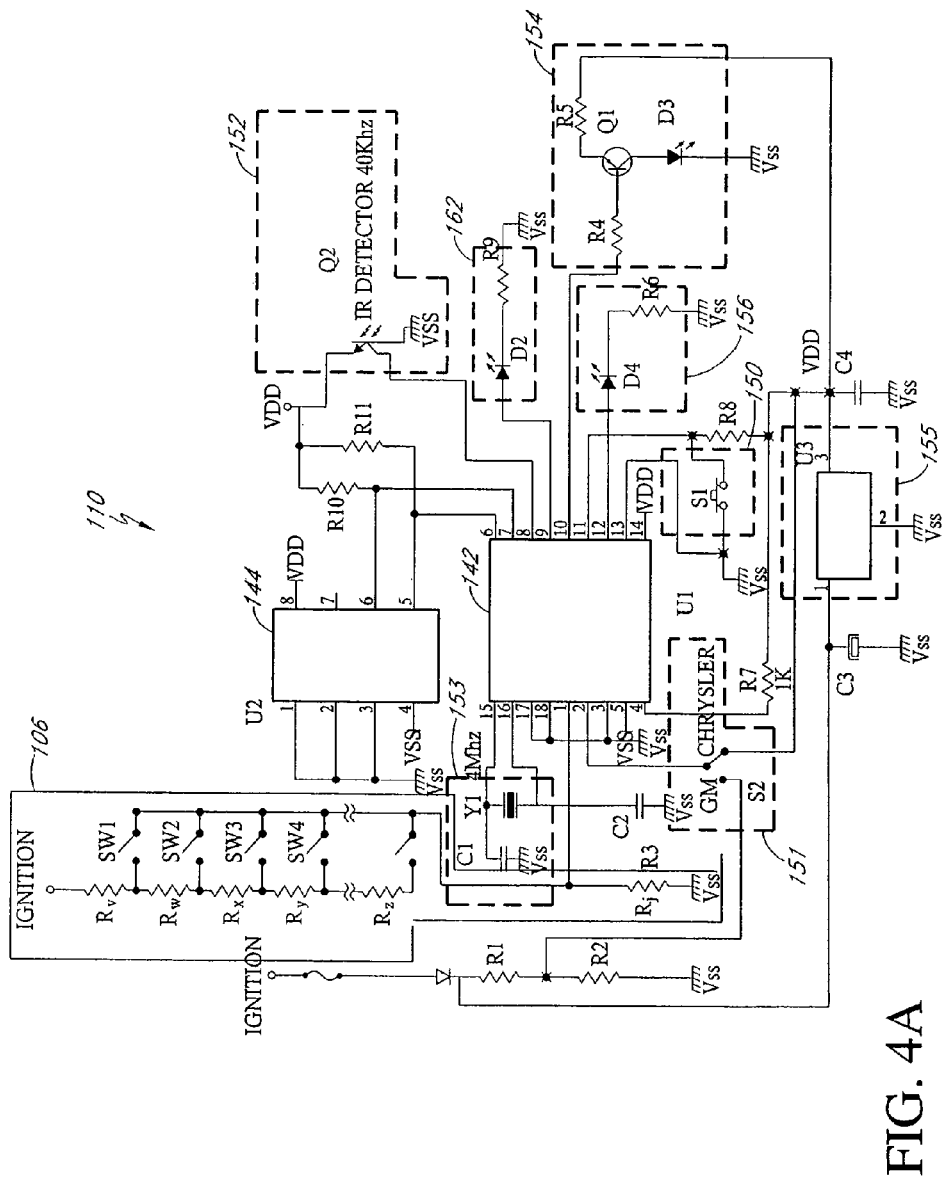
FIG. 4A is a schematic electrical diagram of the circuitry of one embodiment of the remote stereo control interface device.

FIG. 4A is a schematic circuit diagram of the remote interface circuit 110, wherein the remote interface circuit 110 is comprised of the microcontroller 142, the non-volatile memory 144, a plurality of inputs to the microcontroller 142 and outputs from the microcontroller 142. In particular, in this embodiment, the local stereo controls 106 form a voltage divider network that connects to the vehicle ignition voltage source. As a local stereo control 106 is selected, the corresponding resistive network is 'placed' in the circuit and the voltage drop across this resistive element is applied to an analog-to-digital input port of the microcontroller 142. The resistive network of the local stereo controls 106 is comprised of a plurality of resistors (Rv, Rw, Rx, Ry, etc.) in a series configuration along with a plurality of corresponding switches (Sw1, Sw2, Sw3, Sw4, etc.). One side of each of the switches (Sw1, Sw2, Sw3, Sw4, etc.) is connected together and in a series configuration with resistor Rj which is located on-board the remote interface circuit 110.

In operation, the local stereo controls 106 operate as follows. When the user manipulates one of the local stereo controls 106 thereby activating one of the switches Sw1-Sw4, etc., the vehicle ignition voltage source is dropped by the corresponding resistor Rv-Rz, etc. so that a particular voltage signal is produced. This particular voltage signal can then be provided to the original stereo which is programmed to recognize the particular voltage signal as corresponding to a signal to implement a particular stereo function. For example, depressing switch Sw1 may instruct the factory stereo to increase the volume by a particular amount or it may instruct the stereo to change the radio channel to a different preset station.

In the implementation shown in FIG. 4A, the voltage signal from the local stereo controls 106 is provided to the microcontroller 142. As will be described in greater detail below, the microcontroller 142 is preferably configured to receive a particular voltage signal and then produce a corresponding wireless signal that will result in the replacement in-dash stereo 104 changing function in the same manner that the factory installed stereo would change function in response to receiving the same voltage signal. In particular, in one embodiment, the remote interface circuit 110 is designed to produce IR signals that correspond to the signals received from the stereo controls 106, 114 or 130.

As illustrated in FIG. 4A, in this implementation, a plurality of different voltage signals are sent to the microcontroller 142 in response to the user activating the plurality of different switches Sw1-Sw4. The voltage from the switches Sw1-Sw4 is preferably provided to an analog-to-digital converter (A-to-D). In one embodiment, the microcontroller 142 is programmable and the converted digital signal from the switches Sw1-Sw4 can be stored in the non-volatile memory 144 such that when the microcontroller 142 receives this signal, the stored digital signal can be referenced to produce a corresponding wireless signal in the manner that will be described in greater detail below.

In the illustrated embodiment, a GM-Chrysler selector switch 151 is also located on-board the remote interface circuit 110. In particular, the remote interface circuit 110 incorporates the GM-Chrysler selector switch 151 such that when placed in the GM position allows for a voltage drop produced across R2 to be fed to another A-to-D input port of the microcontroller 142. As with the voltage divider networks configured within the local stereo controls 106, the series combination of resistor R1 and R2 also form a voltage divider network with a tap formed at the node of R1 and R2 and the vehicle ignition again serving as a voltage excitation source. The sampled voltage by the microcontroller 142 at this R1 and R2 node forms a reference voltage level against which the same ignition voltage excites the network formed by the local stereo controls 106 and produces selected output voltages. A software algorithm that runs in the microcontroller 142 measures these voltages and provides compensation for voltage fluctuations that occur on the vehicle ignition when the vehicle is a General Motors product. Moreover, when the GM-Chrysler selector switch 151 is placed in the Chrysler position, the reference voltage now becomes VDD (+5 VDC) shown in FIG. 4A at output pin 3 of voltage regulator U3. Chrysler vehicles currently use a regulated +5 VDC supply that does not change with ignition voltage conditions.

Hence, in this embodiment, the remote interface circuit 110 is configurable so as to be adapted for more than one different make or model of vehicle. It will be appreciated that the electrical systems of different makes and models of vehicles vary from vehicle to vehicle. In this particular embodiment, the remote interface circuit 110 can be made as universal as possible such that a single device can be configured to be used with many different types of vehicles.

As is also illustrated in FIG. 4A, the microcontroller also receives an input signal from the IR detector stage 152, wherein the detector stage 152 is formed by the transistor Q2. The transistor Q2 is an IR detector device adapted to accept modulated commands and data from the handheld remote control 160 that is provided with the after-market replacement stereo receiver 104. As discussed above, the after-market stereo receiver 104 is preferably adapted to receive wireless signals from the handheld remote control 160 to control stereo function. In this embodiment, the remote interface circuit 110 is adapted to be able to receive and store the wireless signals from the handheld remote control 160 so that the remote interface circuit 110 can be programmed to reproduce a wireless signal corresponding to the signal produced by a local stereo control 106.

In this embodiment, the remote interface circuit 110 receives a modulated carrier signal from the handheld remote control 160 that is then provided to the microcontroller 142. In particular, the modulated carrier signal is provided by the detector stage 152 to a bi-directional input-output port of the microcontroller 142. Subsequently, the data pattern received by the microcontroller 142 from the detector stage 152 is stored in the non-volatile memory 144 via a serial data transfer link from the microcontroller 142 that has two pull-up resistors R10 and R11. As will be described in greater detail below, this stored data pattern can be retrieved at a later time for use in the run mode such that the remote interface circuit 110 can reproduce the wireless signal produced by the handheld remote control 160 to change a stereo function in response to receiving a corresponding command from the local stereo controls 106.

In this embodiment, the microcontroller 142 receives several other inputs including inputs from a program mode switch 150. The program mode switch 150 is mounted on the PC board and extends through the casing 111 such that a programmer can depress the switch and place the microcontroller 142 in a program mode whereby the microcontroller 142 can be programmed in the manner described below in conjunction with FIG. 5A.

The remote interface circuit 110 also includes several output devices including a local stereo control indicator 156 comprised of an LED D4 that is mounted on the PC board and is visible through the casing 111. The microcontroller 142 is adapted to provide a visual indication, via the local stereo control indicator 156, to the programmer when the microcontroller 142 has received a signal from the local stereo controls 106.

Similarly, the interface circuit 110 also includes a handheld remote learn indicator 162 that is comprised of an LED D2 in series with a current limiting resistor R9 connected to the microcontroller 142. The handheld remote learn indicator 162 is preferably mounted to the casing 111 so as to be visible by the programmer and the microcontroller 142 is programmed so as to be able to provide a visual indication to the programmer when the microcontroller 142 has received a signal from the handheld remote control 160.

The remote interface circuit 110 also includes the output signal transmitter 154 which is comprised of an IR LED D3, a driver transistor Q1, a series base current limiting resistor R4, a current limiting resistor R5 and the output switching port at pin 10 of the microcontroller 142. The IR LED D3 is capable of reproducing the wireless signals previously stored in the memory 144. The output signal transmitter 154 receives these signals via the transmission cable 112 so that the wireless signals can be transmitted to the replacement in-dash stereo 104 in a manner that will be described in greater detail in conjunction with FIGS. 5A and 5B.

FIG. 4A also illustrates a crystal controlled clock 153 comprised of a 4 MHz crystal Y1 in parallel with capacitors C2 and C1 to form an oscillator and which provides a clocking signal to the microcontroller 142. Moreover, the remote interface circuit 110 also includes a voltage regulator circuit 155 that is comprised of a voltage regulator U3, an output filter capacitor C4, and an input filter capacitor C3. The voltage regulator U3 provides a steady state +5 vdc output which is adapted to supply the excitation voltage for the non-volatile memory 144, the microcontroller 142, the detector stage 152, and the output signal transmitter 154.

FIG. 4A illustrates one particular implementation of the remote interface circuit 110. As illustrated, the remote interface circuit 110 receives signals from local stereo control devices, such as steering wheel buttons or switches, passenger switches, handlebar switches and the like, and then translates these signals into signals that are recognizable by the replacement in-dash stereo 104. In this particular implementation, the interface circuit 110 provides corresponding wireless signals, such as IR signals, to the replacement in-dash stereo 104 upon receipt of corresponding input signals from the local stereo controls 106. It will be appreciated that the exact configuration of the remote interface circuit 110 can vary depending upon the configuration of the vehicle and the replacement stereo receiver 104 without departing from the present invention. For example, FIGS. 4B and 4C illustrate several other manners in which local stereo controls 106 are implemented in different types of vehicles.

Figure 4B:
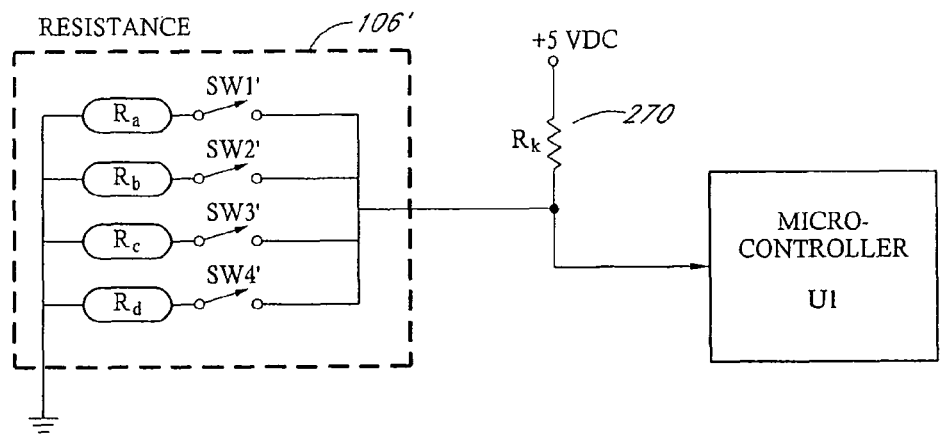
FIGS. 4B and 4C are partial schematic illustrations illustrating alternative configurations of local stereo controls.

FIG. 4B illustrates an alternative configuration of a local stereo control 106', which uses a resistor ladder configuration such that each switch closure selection on the local stereo control 106' connects a different value resistor to the vehicle ground. In particular, if switch Sw1 is depressed on the local stereo control 106', then resistor Ra will be placed in series with fixed resistor Rk and +5 vdc will provide the excitation voltage across the combined resistance of (Ra+Rk) producing a specific voltage drop across Ra. This specific voltage drop across Ra is fed to an A-to-D input port of the microcontroller 142 that corresponds to the selected switch function Sw1. Moreover, sequential switch selections by Sw1, Sw2, Sw3, etc. create specific voltage drops that are sampled by the microcontroller 142 and are used in both the program mode and the run mode in the previously described manner.

Figure 4C:
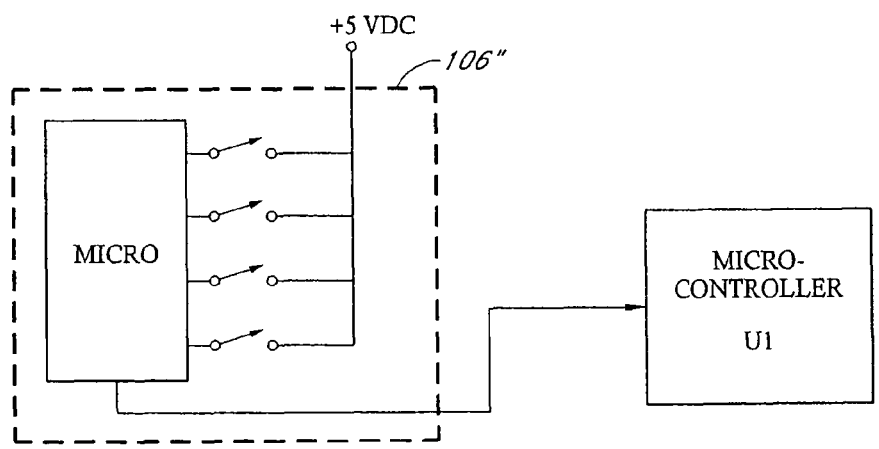

Similarly, FIG. 4C illustrates another embodiment of a local stereo control 106" used by a number of automobile manufacturers. In particular, this embodiment is shown with a microprocessor and a plurality of switches, wherein each switch closure on the local stereo control 106" generates a unique serial data command that is adapted to be accepted by the microcontroller 142 via a digital input port.

FIG. 5A is a flowchart which illustrates a program mode 210 of operation of one embodiment of the remote interface circuit 110 wherein a programmer programs the remote interface circuit 110 to send appropriate wireless signals to an after-market in-dash stereo 104 in response to receiving signals from local stereo controls 106. Advantageously, the remote interface circuit 110 can be programmed by the programmer using the vehicle's local stereo controls 106 and the handheld remote control 160. The programmer simply manipulates a particular stereo control 106, 114, 130 and then depresses a corresponding button on the handheld remote control 160 to program the remote interface circuit 110 so that the remote interface circuit 110 can send the appropriate wireless signal to the replacement in-dash stereo 104.

Figure 5B:
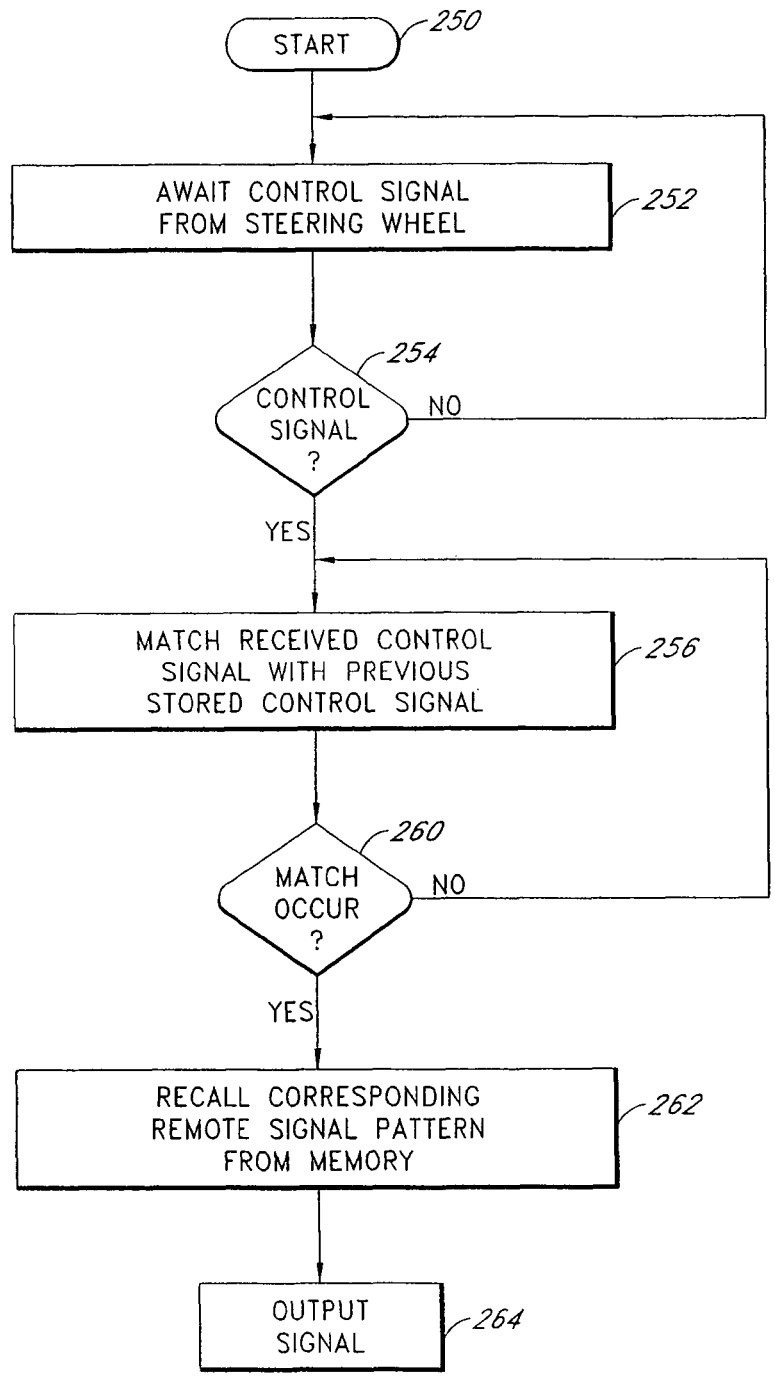
FIG. 5B is an exemplary flow chart illustrating the operation of the microcontroller of the remote stereo control interface device in a run mode.

In particular, as shown in FIG. 5A, the microcontroller 142, from a start state 200, checks the configuration of the microcontroller 142 ports in state 202 and determines, in decision state 204, whether the program mode switch 150 located on the casing 111 of the remote interface circuit 110 has been selected. If the microcontroller 142 determines, in decision state 204, that the program mode switch 150 has not been selected, the microcontroller 142 then enters a run mode 206, wherein the microcontroller 142 is in an operational state that will be described in greater detail in reference to FIG. 5B.

If the microcontroller 142 has determined, in decision state 204, that the program mode switch 150 was selected, the microcontroller 142 enters the program mode 210 and performs a visual indication, in state 210, that the microcontroller 142 is awaiting a control signal from the local stereo controls 106. In this embodiment, the microcontroller 142 illuminates the local stereo control indicator 156 located on the casing 111 of the remote interface circuit 110.

The microcontroller 142 waits to receive a signal from the local stereo controls 106 in state 212. In particular, the programmer selects one of the stereo controls 106, 114, 130 and this results in a stereo control signal being provided to the microcontroller 142 in the manner described above. The microcontroller 142 then ascertains, in decision state 214, whether the local stereo control signal has been received. If the microcontroller 142 determines that a local stereo control input has been received, the microcontroller 142 stores the local control signal in the non-volatile memory 144 in state 216. The microcontroller 142 also provides a visual indication of acknowledgement to the programmer that the control signal was received in state 220, wherein the light emitting diode D4 of the local stereo control indicator 156 is activated.

The microcontroller 142 then provides, in state 222, a visual indication to the programmer that the microcontroller 142 is awaiting a remote signal from the handheld remote control 160. The visual indication to the programmer is provided by the handheld remote learn indicator 162, wherein the light emitting diode D2 located on-board the remote interface circuit 110 is turned on. The microcontroller 142 then awaits a signal from the handheld remote control 160 in state 224. The signal from the handheld remote control 160 is produced in response to the programmer depressing a button that has the same function as the stereo control 106, 114 or 130 previously activated by the programmer and detected by the microcontroller 142 in state 212. The signal is provided by the handheld remote control 160 to the microcontroller 142 via the signal detector stage 152 in the previously described manner.

The microcontroller 142 continues to await the signal from the handheld remote control 160 until the microcontroller 142 determines, in decision state 226, that such a signal has been received. Once the remote control signal is received, the microcontroller 142 stores the received remote control signal pattern to non-volatile memory 144, in storage state 230, and preferably, in association state 232, associates the wireless remote signal pattern to the corresponding control input defined in state 216. In this embodiment, the association or mapping is done by storing the signal corresponding to the received wireless signal from the handheld remote control 160 in a data location in the non-volatile memory 144 adjacent the data location for the corresponding local stereo control signal. Hence, for each local stereo control signal, a corresponding handheld remote control signal can be stored in the non-volatile memory 144 such that subsequent activation of the stereo controls 106, 114, 130 will enable the microcontroller 142 to recall the corresponding wireless signal from the non-volatile memory 144 and produce the corresponding wireless signal via the output signal transmitter 154 in a manner that will be described in greater detail below.

Upon the completion of the association state 232, the microcontroller 142 determines, in decision state 234, whether the programming has been completed. If the programming has not been completed the microcontroller 142 returns to a state 210 where the microcontroller 142 awaits the next stereo control 106, 114, 130 signal. In this way, the programmer can continue programming the remote interface circuit 110 to store input signals from the local stereo controls 106 mounted within the vehicle and also store and map corresponding input signals from the handheld remote control 160 that is used to control the replacement stereo. If the programming has been completed, the microcontroller 142 enters a run mode 206.

FIG. 5B is a flow chart which illustrates the operation of the remote interface circuit 110 in a run mode 206 wherein the remote interface circuit 110 can receive signals from any of the stereo controls 106, 114, 130 and then provide corresponding output signals that are recognizable by the replacement in-dash stereo 104. In particular, the microprocessor 142, from a start state 250, awaits a control signal from the stereo controls 106, 114, 130 in state 252. As discussed above, the stereo controls 106, 114, 130 can be comprised of the local stereo controls 106 or the alternate stereo controls 114 or both, illustrated in FIG. 1, the handlebar stereo controls 130 from a motorcycle 116, illustrated in FIGS. 2A and 2B, or any other control that is remotely located from the face of the in-dash stereo 104.

Upon the microprocessor 142 determining, in decision state 254, that a local control signal has been received from the local stereo control 106, the microcontroller 142 then matches, in state 256, the received local control signal with a previously stored output signal in the memory 144. As discussed above in connection with the description of the program mode 210 of the microcontroller 142 in FIG. 5A, by sequentially programming each of the stereo controls 106, 114, 130 with the corresponding button on the handheld remote control 160, the microcontroller 142 is able to map these two signals such that the microprocessor 142 is capable of recalling the corresponding output signal from the non-volatile memory 144. In other words, the microcontroller 142, upon receipt of the input signal from the local stereo control 106, recalls, from the memory 144, a digital signal that can then be used to generate an appropriate output signal via the output signal transmitter 154 that will be recognizable by the replacement in-dash stereo 104.

The microcontroller 142 then determines, in decision state 260, whether a match has occurred and, if a match has occurred, the microcontroller then recalls the corresponding remote signal pattern from the memory 144, in state 262, and then outputs the appropriate IR signal via the output signal transmitter 154, in state 264. As discussed above, the replacement in-dash stereo 104 is preferably adapted to receive signals, such as wireless signals, including I/R signals, from the handheld remote control 160. Preferably, the microcontroller 142 is programmed such that it is capable of reproducing the same wireless signal that would be provided by the handheld remote control 160.

Hence, the user can program the remote interface circuit 110 such that controls, such as increase or decrease volume, change channels and the like, on the steering wheel 102 or some other remote location within the vehicle can be used to generate corresponding wireless signals from the remote interface circuit 110. The remote interface circuit 110 thereby allows factory installed vehicle remote controls for a factory stereo to continue to be used with a replacement stereo receiver. This greatly increases the flexibility for individuals wishing to replace their factory stereos as it does not eliminate the utility of the remote vehicle controls.

Figure 6:
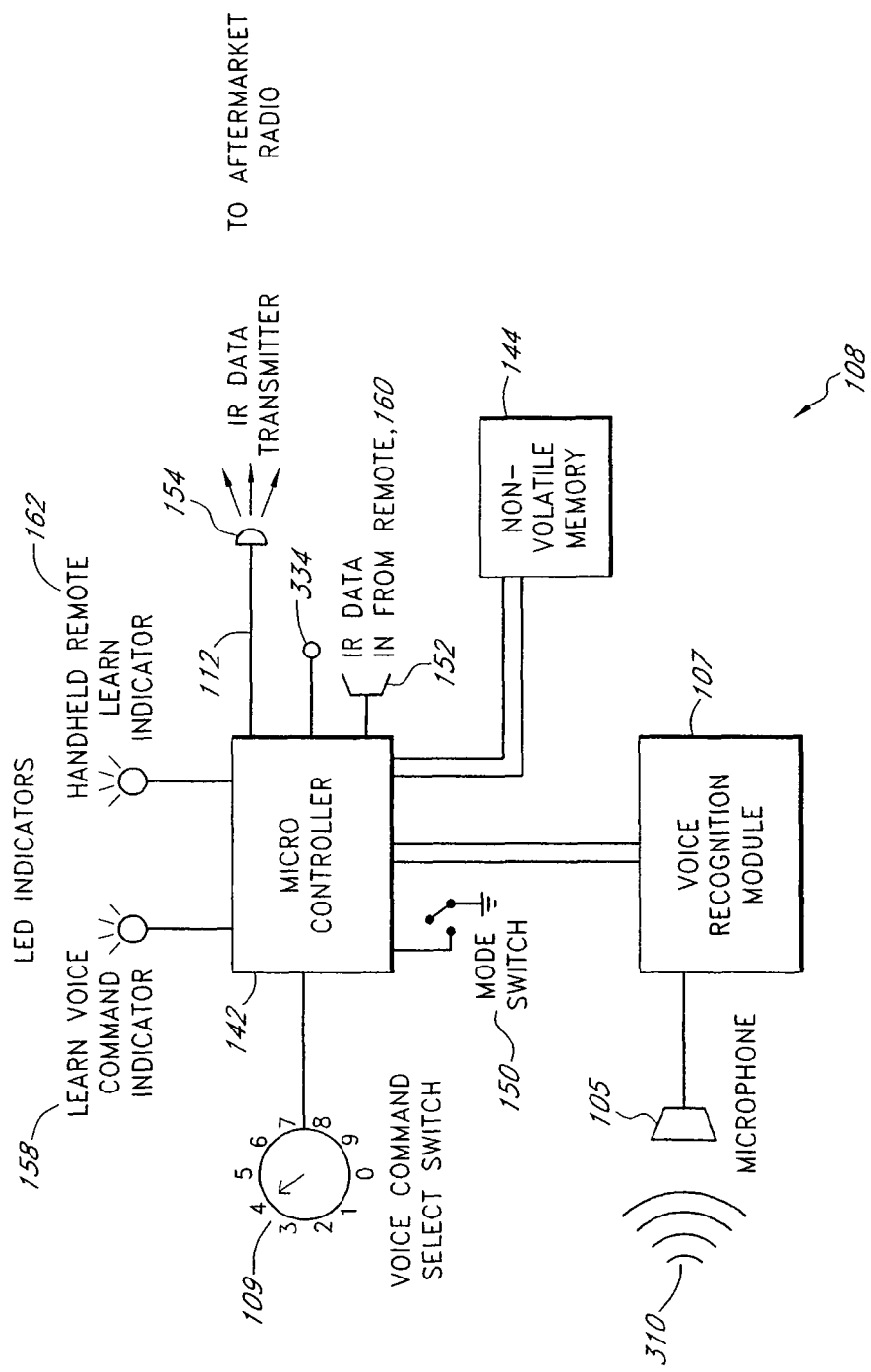
FIG. 6 is a block diagram showing the configuration of a voice control interface to enable voice commands to control a stereo or other parts of a motor vehicle.

FIG. 6 illustrates another embodiment of the present invention in which a voice control interface 108 is adapted to respond to spoken voice commands 310 and transmit corresponding signals to an aftermarket in-dash stereo 104. The voice commands 310 are spoken words or phrases that a user desires to use to control features of a motor vehicle, such as a stereo control unit or receiver. The voice control interface 108 functions in a similar manner to that previously described for the remote control stereo interface system 100 with local stereo controls 106 except that the inputs to the voice control interface 108 are spoken voice commands 310 rather than the manipulation of local stereo controls 106. Otherwise the components, functions, and features of the voice control interface 108 are substantially similar to those previously described for the remote control stereo interface 100.

The voice control interface 108 comprises a microphone assembly 105 and a voice recognition module 107. The microphone assembly 105 is adapted to transduce voice commands 310 in the normal range of human hearing from approximately 20 Hz to 20 kHz and send a corresponding analog electrical signal along an attached cable in a manner well known in the art. The microphone assembly 105 is a commonly available industry standard miniature microphone. A first end of the microphone assembly 105 is connected to an input of the voice recognition module 107. A second end of the microphone assembly 105 is placed adjacent the driver or passenger so as to readily pick up voice commands 310. The microphone assembly 105 is preferably placed behind the dashboard 103 or in another location so as to be unobtrusive to the driver or passengers.

The voice control interface 108 also comprises a voice recognition module 107. The voice recognition module 107 is preferably a speaker-dependent commercially available item such as the type HM2007 available from Images Company of Staten Island, N.Y. or the Voice Direct™ 364 available from Sensory, Inc. of Sunnyvale, Calif. The voice recognition module 107 is provided with on-board memory to store digitized sound patterns. The voice recognition module 107 is provided with inputs adapted to receive analog electrical signals from the microphone assembly 105. The voice recognition module 107 includes an analog-to-digital converter (A-to-D). The A-to-D continuously converts the analog signals received from the microphone assembly 105 to digital equivalents. The voice recognition module 107 continuously compares the digitized audio patterns to stored voice command 310 patterns. When the voice recognition module 107 recognizes a match with a stored voice command 310, the voice recognition module 107 sends a serial digital signal corresponding to the stored voice command 310 to a microcontroller 142 via the outputs of the voice recognition module 107 in a manner well known in the art.

The voice control interface 108 also comprises a microcontroller 142. The microcontroller 142 is adapted to receive electrical signals from the voice recognition module 107 and the microphone 105 for the purpose of controlling the replacement in-dash stereo 104. The microcontroller 142 is also adapted to receive a signal from a detector stage 152 from a handheld remote control 160. As is well understood in the art, the detector stage 152 is adapted to receive and demodulate a wireless signal sent by a handheld remote control 160 for the in-dash stereo 104. As will be described in greater detail below, the microcontroller 142 is preferably adapted to be able to receive, from the handheld remote control 160, the wireless signal for controlling a particular stereo function, store this signal and then reproduce and broadcast this signal to the after-market in-dash stereo 104 when a voice command 310 is spoken corresponding to the function of the stored signal.

The voice control interface 108 also comprises non-volatile memory 144. The non-volatile memory 144 is adapted to store digital messages corresponding to the IR patterns sent by the handheld remote control 160 and be able to provide these messages to the microcontroller 142 as needed in the manner previously described.

The voice control interface 108 also comprises a transmission cable 112. In this embodiment, the transmission cable 112 includes an output signal transmitter 154 that is located in line of sight of a remote signal receiver (not shown) on the after-market in-dash stereo 104. The transmission cable 112 is generally 4 feet in length and is positioned in the vehicle dashboard 103 such that the tip of the transmission cable 112 that is comprised of the output signal transmitter 154 is positioned generally within close proximity of the in-dash stereo 104. The transmission cable 112 is connected to the microprocessor 142 and the transmission cable 112 and attached output signal transmitter 154 are adapted to transmit wireless IR signals that the microcontroller 142 has retrieved from the non-volatile memory 144 and which correspond to control signals sent by the handheld remote control 160.

The voice control interface 108 also comprises a voice command select switch 109. The voice command select switch 109 in this embodiment is a ten position rotary switch of a type well known in the art. The voice command select switch 109 is connected to the microcontroller 142 and allows the voice control interface 108 to learn up to ten different voice commands 310 in a manner that will be described in greater detail below.

The voice control interface 108 also comprises a learn voice command indicator 158 and a handheld remote learn indicator 162. The learn voice command indicator 158 and handheld remote learn indicator 162 are light emitting diodes (LED's) and provide the user a visual indication of the status of the programmability of voice commands 310 in a manner that will be described in greater detail below.

The voice control interface 108 also comprises a program mode select switch 150. The program mode select switch 150, when selected, instructs the microcontroller 142 to enter a program mode, allowing the microcontroller 142 to learn and record the specific voice commands 310 and IR command signals from the handheld remote control 160 in a manner that will be described in greater detail below.

It can be appreciated that the voice control interface 108 can be readily adapted to function with the local stereo controls 106 previously described in conjunction with the voice commands 310 herein described. The voice control interface 108 can also be readily provided with auxiliary outputs 334 adapted to control other features of a motor vehicle such as raising and lowering windows, locking or unlocking doors, moving seats, switching on headlights, etc. The auxiliary outputs 334 can be adapted to control the features of the vehicle directly or can operate relays and the like in a manner well understood by those skilled in the art.

Figure 7:
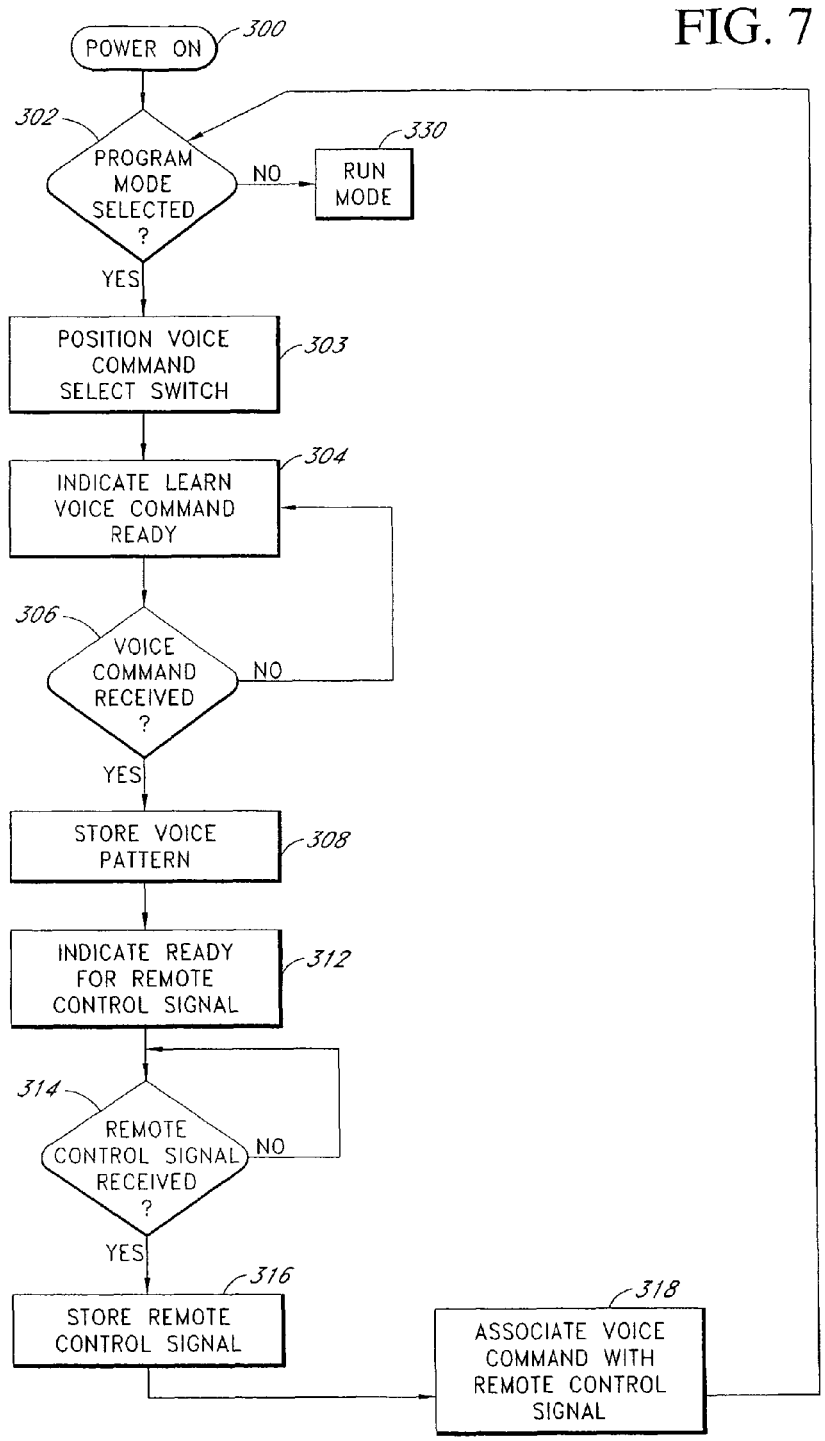
FIG. 7 is a flow chart depicting the operation of the voice control interface in the program mode of operation.

FIG. 7 shows the operation of the voice control interface 108 in a program mode 320. From a power on 300 state, the voice control interface 108 determines the position of the program mode select switch 150 in a decision state 302. If the voice control interface 108 determines, in the decision state 302, that the program mode select switch 150 is in the program position, the voice control interface 108 enters the program mode 320. The user then positions the voice command select switch 109 to the desired position, in a state 303. The voice command select switch 109 allows the user to select and program up to ten different voice commands 310.

The voice control interface 108 provides an indication, in state 304, that the voice control interface 108 is ready to receive and program a voice command 310. The indication in state 304 is provided by the learn voice command indicator 158 illuminating. While the voice control interface 108 is indicating, in state 304, that the voice control interface 108 is ready to receive and program a voice command 310, the voice control interface 108 determines, in decision state 306, whether a voice command 310 has been received by the voice control interface 108. Once the user speaks a voice command 310, the voice recognition module 107 digitizes and stores the sound pattern of the voice command 310 in the on-board memory location corresponding to the voice command 310 selected by the voice command select switch 109 in a storage state 308.

The voice control interface 108 then provides, in state 312, a visual indication to the programmer that the voice control interface 108 is awaiting a signal from the handheld remote control 160. The visual indication to the programmer is provided by the handheld remote learn indicator 162, wherein the light emitting diode D2 is turned on. The voice control interface 108 then awaits a signal from the handheld remote control 160, in state 312. The signal from the handheld remote control 160 is produced in response to the programmer depressing a button that has the same function as the voice command 310 previously spoken by the programmer and stored by the voice recognition module 107, in state 308. The signal is provided by the handheld remote control 160 to the voice control interface 108 via the signal detector stage 152 in the previously described manner.

The voice control interface 108 awaits a signal from the handheld remote control 160 until the voice control interface 108 determines, in decision state 314, that such a signal has been received. Once the remote control signal is received, the voice control interface 108 stores the received remote control signal pattern to non-volatile memory 144, in storage state 316, and preferably, in association state 318, associates the wireless remote signal pattern to the corresponding voice command 310 defined in state 308. In this embodiment, the association or mapping is done by storing the signal corresponding to the received wireless signal from the handheld remote control 160 in a data location in the non-volatile memory 144 adjacent the data location for the corresponding voice command 310. Hence, for each voice command 310, a corresponding handheld remote control signal can be stored in the non-volatile memory 144 such that subsequent speaking of the voice command 310 will enable the microcontroller 142 to recall the corresponding wireless signal from the non-volatile memory 144 and produce the corresponding wireless signal via the output signal transmitter 154 in the manner previously described.

Upon the completion of the association state 318, the voice control interface 108 determines, in decision state 302, whether the program mode 320 is still selected. If the programming has not been completed the voice control interface 108 returns to state 303 where the user selects the next voice command 310 via the voice command select switch 109 and the voice control interface 108 awaits the next voice command 310. In this way, the programmer can continue programming the voice control interface 108 to store additional voice commands 310 and also store and map corresponding input signals from the handheld remote control 160. The voice control interface 108 provides the ability to write over programmed voice commands 310 thereby allowing the user to change the voice command 310 wording or to allow a subsequent user to reprogram the voice control interface 108 to recognize their voice patterns. If the programming has been completed, the voice control interface 108 enters a run mode 330.

Figure 8:
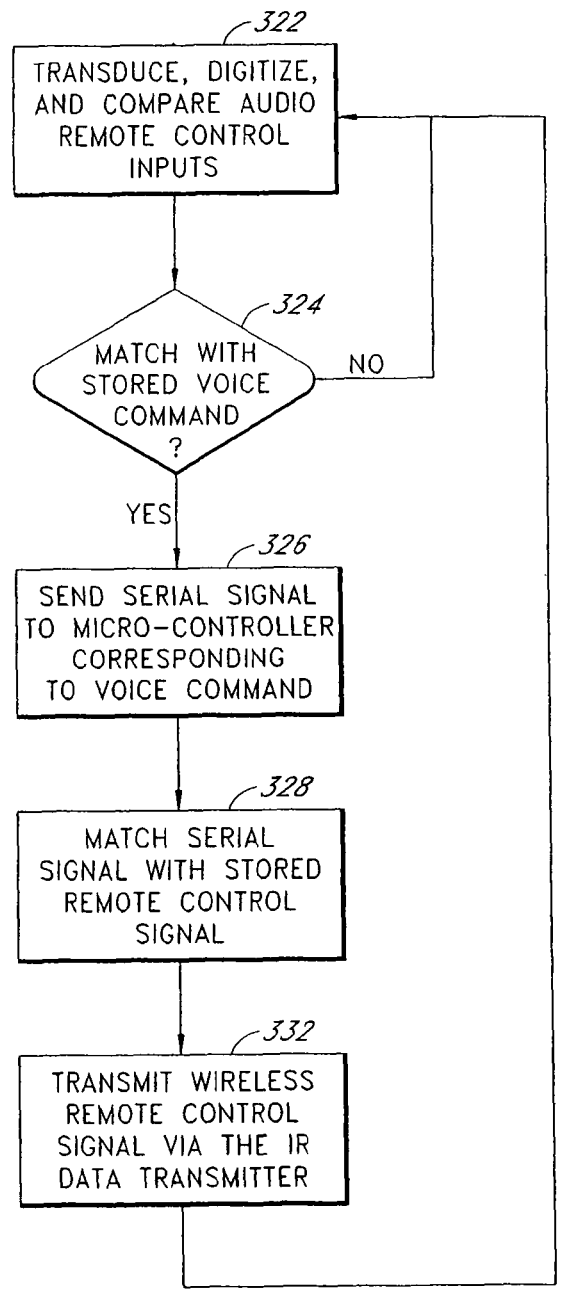
FIG. 8 is a flow chart depicting the operation of the voice control interface in the run mode of operation.

FIG. 8 illustrates the operation of the voice control interface 108 in the run mode 330. The voice control interface 108 and, in particular, the voice recognition module 107 is adapted to continuously monitor audio input via the microphone assembly 105, in state 322. The voice recognition module 107 is capable of continuous listening wherein the voice recognition module 107 digitizes the audio input from the microphone assembly 105 and compares, in a known manner, the digitized sound patterns to those stored in on-board memory as voice commands 310 in the program mode 320. When the voice recognition module 107 recognizes a match, in decision state 324, the voice recognition module 107 sends a serial signal to the microcontroller 142 corresponding to the recognized voice command 310 in state 326.

In state 328, the microcontroller 142 matches the received serial signal for a voice command 310 with the corresponding remote control signal previously stored in non-volatile memory 144 in the program mode 320 in the manner previously described. The voice control interface 108 then sends the remote control signal to be transmitted via the output signal transmitter 154 in the manner previously described. The voice control interface 108 then returns to listening state 322.

It can be appreciated that the voice control interface 108 offers a program mode 320 wherein the user can program voice commands 310 as desired and enable the user to control a replacement in-dash stereo 104 with voice commands 310. The voice control interface 108 can write over the programmed voice commands 310 thereby allowing the user to change voice commands 310 or to allow subsequent users to program the voice control interface 108 for their own voice patterns. It can be appreciated that by using voice commands 310 the driver need not divert his attention away from the task of driving and can thereby change the operation of the stereo while still driving in a safe manner. The voice control interface 108 allows a user to retrofit convenient voice controls in an economical manner to a vehicle that did not originally come equipped with remote controls for the stereo.

Figure 9:
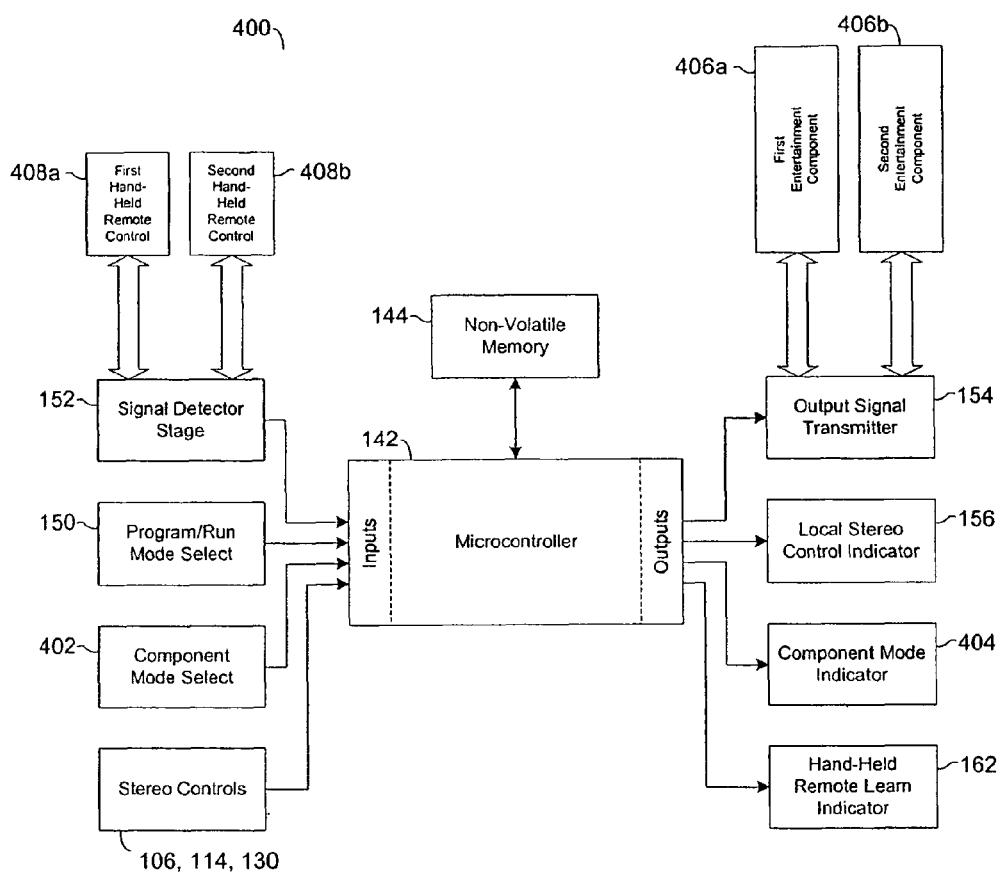
FIG. 9 is a schematic block diagram illustrating another embodiment of the basic configuration of the remote stereo control interface device of FIGS. 1 and 2.

FIG. 9 illustrates yet another embodiment of the present invention in which a remote stereo control interface device or electronic system control (ESC) interface 400 may be adapted to control a plurality of electronic components, such as a first electronic component 406a and a second electronic component 406b having a second hand-held remote control 408b. In one aspect, the first electronic component 406a may comprise a first entertainment component including a factory-installed stereo system, and the second electronic component may comprise a second entertainment component including an after-market video system that includes the hand-held remote control 408b with similar functionality as the hand-held remote control 160 in FIG. 3.

Additionally, the ESC interface 400 comprises the scope and functionality of the stereo control interface system 100, 101 in FIG. 3 with the addition of expanded functionality and operational features. The expanded functionality and operational features provides a user or occupant the option of switching the operation of the local stereo controls 106, 114, 130 or occupant activated switches between the plurality of entertainment components 406a, 406b. The local stereo controls 106, 114, 130 provide input signals to the microcontroller 142 of the ESC interface 400 in a similar manner as described in reference to FIG. 3. Moreover, the ESC interface 400 may further comprise the component mode select switch 402 and the component mode indicator 404.

It should be appreciated that the first entertainment component 406a may comprise either an audio component, such as a stereo, or a video component having a display monitor, such as a digital video disc (DVD) player without departing from the scope of the present invention. The audio component may be positioned within the vehicle and configured to provide first plurality of entertainment signals, such as audio signals, to at least one occupant within the vehicle, and the video component, may also be positioned within the vehicle and configured to provide a second plurality of entertainment signals, such as video signals, to the at least one occupant within the vehicle. Similarly, the second entertainment component 406b may comprise either an audio component or a video component and provide the corresponding entertainment signals to the at least one occupant within the vehicle without departing from the scope of the present invention. In one aspect, as illustrated in FIG. 1, the steering wheel controls 106 may comprise an existing controller that is originally electrically connected to the first electronic component 406a.

It should also be appreciated that the ESC interface 400 may be adapted to operate, manage, and control one or more electronic devices that may be controlled via wireless remote control signals, such as infrared (IR) signals and/or radio frequency (RF) signals, from a plurality of hand-held remote controls 408a, 408b. Therefore, the first entertainment component 406a may comprise the after-market stereo system 104, as described in FIG. 3, having a first hand-held remote control 408a, such as the corresponding hand-held remote control 160. Moreover, the after-market entertainment components may include original equipment manufacturer (OEM) entertainment components that may be considered replacement entertainment components for factory-installed entertainment components.

Additionally, the microcontroller 142 of the ESC interface 400 may be adapted to receive a recognizable input signal, such as an applied voltage signal, from the component mode select switch 402. In one embodiment, the component mode select switch 402 is a orientation select switch, such as a toggle switch, having a first orientation and a second orientation. In this particular aspect, the configuration enables the microcontroller 142 to distinguish between the first and second orientation of the component mode select switch 402 based on the orientation of the toggle switch.

In another embodiment, the component mode select switch 402 may be a push-button switch, wherein the microcontroller 142 may be configured to recognize the activation of the push-button switch and then time the length of activation to distinguish between recognizable temporal thresholds. The activation may comprise depressing the push-button switch for a period of time, wherein a voltage signal may be applied to an input of the microcontroller 142 for the period of time, such as three seconds. In this particular embodiment, the configuration enables the microcontroller 142 to distinguish between the first and second orientation of the component mode select switch 402 based on the timing differential of the applied signal. In one aspect, the applied voltage signal is produced by an occupant depressing the component mode select switch 402 for the period of time. Moreover, the timing differential may be used by the microcontroller 142 for switching between a plurality of component mode selection states as will be described in greater detail herein below.

In still another embodiment, the activation of the push-button switch may comprise depressing the switch, in a sequential manner, a pre-determined number of depressions, such as two or three, wherein a voltage signal may be applied in sequential intervals over a pre-timed temporal period to an input of the microcontroller 142. In this particular embodiment, the configuration enables the microcontroller 142 to distinguish between the first and second orientation of the component mode select switch 402 based on the number of control signals that are applied within a certain timed interval. In one aspect, the number of applied input signals and/or the number of sequential depressions within a pre-determined temporal period may be used by the microcontroller 142 for switching between a plurality of component mode selection states in a manner as will be described in greater detail herein below.

In one aspect, the component mode select switch 402 may comprise an occupant activated switch selected from the local stereo controls 106, 114, 130 in FIGS. 1, 2A, 2B. Alternatively, the component mode select switch 402 may comprise a separate occupant activated switch, such as a power-up activation switch, that may be positioned adjacent to the casing 111 in FIGS. 1, 2A of the remote interface circuit 110 in FIG. 4A. When selected, the component mode select switch 402 instructs the microcontroller 142 to switch component control between the plurality of entertainment components 406a, 406b, such as an audio component or a video component, which will be described in further detail herein below.

Furthermore, the microcontroller 142 of the ESC interface 400 may be adapted to send an electrical signal to the component mode indicator 404. The component mode indicator 404 may comprise at least one light emitting diode (LED) and may provide the user a visual indication of the entertainment component 406a, 406b that is currently selected for control via the local stereo controls 106, 114, 130. In one aspect, the first orientation of the component mode select switch 402 may provide voltage to the component mode indicator 404, which may cause the LED to transition to a lighted state. Alternatively, the second orientation of the component mode select switch 402 may cause the LED of the component mode indicator to transition to a non-lighted state. It should be appreciated that the lighted state may correspond to the second orientation and the non-lighted state may correspond to the non-lighted state without departing from the scope of the present invention. The functionality of the component mode select switch 402 and the component mode indicator 404 will be further described in greater detail herein below.

In one aspect, the ESC interface 400 may utilize the vehicle's factory-installed local stereo controls 106, 114, 130 to control, manage, and operate the second entertainment component 406b, which may comprise an after-market video system, while still maintaining normal control and operation of the first entertainment component 406a, such as the factory-installed stereo system or the after-market stereo system 104. One advantage gained is that the ESC interface 400 potentially solves the problem of lost remote controls in a vehicle for the factory-installed and/or the after-market entertainment components. Furthermore, the ESC interface 400 allows the driver to control a plurality of entertainment components 406a, 406b without taking at least one hand off the steering wheel or diverting attention away from safely operating the vehicle.

In one embodiment, one button on the local stereo controls 106, 114, 130 is designated by the user, occupant, or programmer as the component mode select switch 402. The component mode select switch 402 will be used to "switch over" operation of the local stereo controls 106, 114, 130 to operate at least one alternative entertainment component, such as the second entertainment component 406b, which may comprise the after-market video system. In one aspect, the ESC interface 400 may control the after-market video system by learning the IR or RF commands of the video system device's wireless remote in a manner as previously described with reference to FIG. 5A. Then, the ESC interface 400 repeats the learned IR or RF commands each time the component mode select switch 402 or button on the local stereo controls 106, 114, 130 is actuated or activated by the user, occupant, or driver in a manner as previously described in FIG. 5B.

Additionally, the ESC interface 400 is connected to the vehicle by intercepting the local stereo control signal wires between the local stereo controls 106, 114, 130 and the first entertainment component 406a or the factory-installed stereo 104. In one aspect, the programming of the component mode select switch 402 will not significantly affect the scope and functionality of the local stereo controls 106, 114, 130. Therefore, the local stereo controls 106, 114, 130 will substantially retain the factory-installed radio or stereo control functions. Furthermore, as a result of switching the component mode select switch 402 to control the second entertainment component 406b or the after-market video system, the control buttons on the local stereo controls 106, 114, 130 are directed by the ESC interface 400 to operate the second entertainment component 406b or the after-market video system. In addition, it should be appreciated that, after being prompted by the component mode select switch 402, the ESC interface 400 switches the IR or RF wireless data signals and/or commands to the specific device selected by the component mode select switch 402.

In one embodiment, the microcontroller 142 may be programmed to determine when to switch the component selection state the component selection state of the component mode select switch 402 by using a temporal threshold or timing differential, such as a three-second timing threshold or differential. In this particular embodiment, the component mode selection state may comprise a first component mode selection state and a second component mode selection state, wherein the first component mode selection state designates the control of the first entertainment component 406a, and the second component mode selection state designates control of the second entertainment component 406b. In addition, when the component mode selection state is switched, the microcontroller 142 may also be configured to signal the component mode indicator 404 to switch states, such as a non-lighted LED state to a lighted LED state. It should be appreciated by one skilled in the art that any amount of time may be used to determine when to switch component mode selection states without departing from the scope of the present invention.

For example, if the component mode select switch 402 is depressed for approximately three seconds, then the microcontroller 142 may switch the component mode selection state from the first component mode selection state to the second component mode selection state, and the microcontroller 142 may also signal the component mode indicator 404 to switch to the lighted "on" state. In addition, if the component mode select switch 402 is depressed again for approximately three seconds, then the microcontroller 142 may switch the component mode selection state from the second component mode selection state to the first component mode selection state, and the microcontroller 142 may also signal the component mode indicator 404 to switch to the non-lighted "off" sate. It should be appreciated that the timing threshold may be altered to be longer or shorter than three seconds so as to comprise any period of time without departing from the scope of the present invention.

In another embodiment, the microcontroller 142 may be programmed to determine when to switch the component selection state of the component mode select switch 402 by counting the number of times that the component mode select switch is depressed within a certain time frame, such as three depressions within a three-second timed period. Similar to the previously described embodiment, the component mode selection state may comprise a first component mode selection state and a second component mode selection state, wherein the first component mode selection state designates the control of the first entertainment component 406a, and the second component mode selection state designates control of the second entertainment component 406b. In addition, when the component mode selection state is switched, the microcontroller 142 may also be configured to signal the component mode indicator 404 to switch states, such as a non-lighted LED state to a lighted LED state. It should be appreciated that any number of switch depressions within any amount of time may be used to determine when to switch component mode selection states without departing from the scope of the present invention.

For example, if the component mode select switch 402 is depressed three separate times within a three second period, then the microcontroller 142 may switch the component mode selection state from the first component mode selection state to the second component mode selection state, and the microcontroller 142 may also signal the component mode indicator 404 to switch to the lighted "on" state. In addition, if the component mode select switch 402 is depressed again three separate times within a three second period, then the microcontroller 142 may switch the component mode selection state from the second component mode selection state to the first component mode selection state, and the microcontroller 142 may also signal the component mode indicator 404 to switch to the non-lighted "off" sate. It should be appreciated that any number of switch depressions may be altered within any amount of time without departing from the scope of the present invention.

In one aspect, when the microcontroller 142 senses that the component mode select switch 402 has been pressed, the microcontroller interrupts the control signal to the first entertainment component 406a and then waits for the component mode select switch 402 to be released. When the component mode select switch 402 is released after the pre-determined length of time, the microcontroller 142 switches component control states from the first entertainment component 406a to the second entertainment component 406b and then waits for another button on the local stereo controls 106, 114, 130 to be pressed. If the component mode select switch 402 was not held down for the pre-determined length of time, such as three seconds, then the microcontroller 142 never switches the component selection state and subsequently passes the control signal onto the first entertainment component 406a instead of passing the control signal to the second entertainment component 406b.

In another aspect, when the microcontroller 142 senses that the component mode select switch 402 has been pressed and released at least once, the microcontroller interrupts the control signal to the first entertainment component 406a and then waits for the component mode select switch 402 to be additionally pressed and released a pre-determined number of times. When the component mode select switch 402 is pressed and released the pre-determined number of times, the microcontroller 142 switches component control states from the first entertainment component 406a to the second entertainment component 406b and then waits for another button on the local stereo controls 106, 114, 130 to be pressed. If the component mode select switch 402 was not pressed and released for the pre-determined number of times, such as three presses and releases, then the microcontroller 142 never switches the component selection state and subsequently passes the control signal onto the first entertainment component 406a instead of passing the control signal to the second entertainment component 406b.

It should be appreciated that if the microcontroller 142 senses the first component mode selection state, then the control input signals to and the control output signals from the microcontroller 142 are applied to the first entertainment component 406a. The control input signals to the microcontroller 142 include the stereo controls 106, 114, 130, the program/run mode select switch 150, and the signal detector stage 152. The scope and functionality of the control input signals and the modes of operation, including the program mode of operation and the run mode of operation, are applied by the microcontroller 142 to the first entertainment component 406a in a manner as previously described.

Furthermore, the control output signals from the microcontroller 142 include the output signal transmitter 154, the local stereo control indicator 156, and the hand-held remote learn indicator 162. Moreover, the scope and functionality of the control output signals, including hardwired and wireless control signals, are applied by the microcontroller 142 to the first entertainment component 406a. Similarly, when the microcontroller senses the second component mode selection state, the control input signals to and the control output signals from the microcontroller 142 are subsequently applied to the second entertainment component 406b. In that respect, the first and second entertainment components 406a, 406b may utilize the program and run modes of operation as previously described in FIG. 5A, 5B depending on the orientation of the component mode select switch 402.

Advantageously, the scope and functionality of the program mode 210 in FIG. 5A and the run mode 250 in FIG. 5B may be applied to first and second entertainment components 406a, 406b. In addition, by actuating the component mode select switch 402, the ESC interface 400 may learn the IR or RF commands of a plurality of different devices that may be controlled via IR remote signals by using the program mode 210 of operation. The expanded functionality and operational features provides a flexible and, yet, powerful interface tool when integrating after-market entertainment systems into vehicles equipped with factory-installed entertainment control components.

Figure 10:
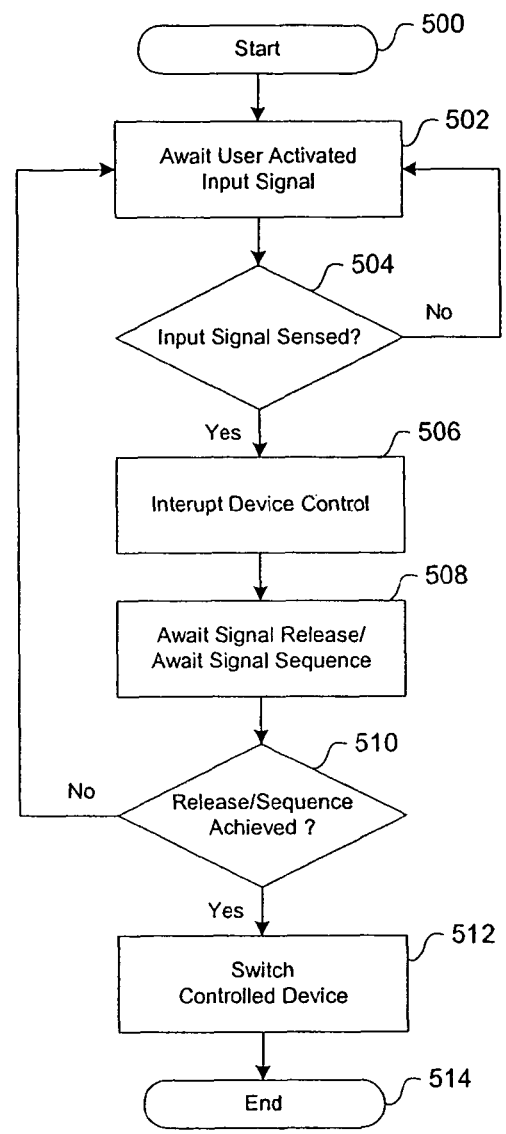
FIG. 10 illustrates one embodiment of a component mode selection process that may be used by the remote stereo control interface device in FIG. 9 to switch component mode selection states in a manner as described with reference to FIG. 9.

FIG. 10 illustrates one embodiment of a component mode selection process that may be used by the microcontroller 142 to switch component mode selection states in a manner as described with reference to FIG. 9. The process initiates in a start state 500 and advances to a state 502 where the microcontroller 142 waits for one or more user activated input signals, such as one or more applied voltage signals, from, for example, the component mode selection switch 402. If the one or more input signals are sensed by the microcontroller 142 in a decision state 504, then the microcontroller 142 may interrupt control of the first and/or second entertainment components 406a, 406b.

It should be appreciated that the microcontroller 142 may or may not interrupt control of the first and/or second entertainment components 406a, 406b without departing from the scope of the present invention. Alternatively, if the one or more input signals are not sensed by the microcontroller 142 in the decision state 504, then the component mode selection process returns to the state 502 to await the one or more user activated input signals from, for example, the component mode selection switch 402.

After interrupting device control in the state 506, the microcontroller 142 awaits the input signal release and or awaits the input signal sequence. As previously described in FIG. 9, the recognizable input signals may comprise either depressing the component mode select switch 402 for a pre-determined length of time or sequentially depressing/releasing the component mode select switch 402 a pre-determined number of times within a pre-determined length of time. When, in a decision state 210, the component mode selection switch 402 is released or the depress/release sequence is sensed, a determination of whether the pre-determined length of depression time or the pre-determined number of sequential press/release actuations were achieved. If achieved, then the microcontroller 142 switches user control of the current entertainment component to the other entertainment component in a state 512. Otherwise, if not achieved, the component mode selection process returns to the state 502 to await the one or more user activated input signals from, for example, the component mode selection switch 402. Once component mode selection is switched in the state 512, the component mode selection process terminates in an end state 514.

Advantageously, the above-mentioned electronic control system may be configured to operate and control a plurality of entertainment components, such as the first and second entertainment component 406a, 406b. The first entertainment component 406a may comprise a factory-installed stereo system, and the second entertainment component 406b may comprise an after-market video system. Additionally, the electronic control system may comprise expanded functionality and operational features, wherein the expanded functionality and operational features provides a user or occupant the option of switching the operation of the local stereo controls 106, 114, 130 or occupant activated switches between the plurality of entertainment components 406a, 406b from, for example, the steering wheel.

Advantageously, by using the aforementioned electronic control system, the user may conveniently control a plurality of entertainment devices without having to actually reach for the one or more entertainment devices. The disclosed system promotes convenience and safety because the driver will not have to remove a hand from the steering wheel to change operation or control the plurality of entertainment devices, and the driver is less likely to be distracted from driving when doing so. Also, passengers will likely stay in their seats when operating and/or controlling the one or more entertainment system units making it unlikely that the passengers would unbuckle their safety belt to control the one or more entertainment system units. As a result, the aforementioned electronic control system provides many safety advantages to the driver and passengers alike.

Although the following description exemplifies one embodiment of the present invention, it should be understood that various omissions, substitutions, and changes in the form of the detail of the apparatus, system, and/or method as illustrated as well as the uses thereof, may be made by those skilled in the art, without departing from the spirit of the present invention. Consequently, the scope of the present invention should not be limited to the disclosed embodiments, but should be defined by the appended claims.

The invention claimed is:

1. A stereo control interface device adapted to be installed in a vehicle as an aftermarket product,
wherein the stereo control interface device is adapted to be hardwired coupled to at least one local vehicle stereo control device originally installed in the vehicle so as to receive signals in a first format from the at least one local vehicle stereo control device to control an originally installed stereo receiver that was responsive to signals in the first format,
wherein the stereo control interface device is adapted to produce output signals in a second format and transmit the output signals via hardwire connection to a replacement aftermarket stereo receiver that is responsive to signals in the second format and that is installed in the vehicle to replace the originally installed stereo receiver,
wherein the stereo control interface device is adapted to translate the signals in the first format to signals in the second format so that the at least one local vehicle stereo control device originally installed in the vehicle can be used to control the operation of the replacement aftermarket stereo receiver via the stereo control interface device,
wherein the stereo control interface contains in a memory output signals corresponding to the local vehicle stereo control device signals such that activation of the local vehicle stereo control results in the stereo control interface recalling front the memory at least one output signal corresponding to at least one of the local vehicle stereo control device signals and
wherein the stereo control interface is adapted for use with a plurality of different types of replacement stereo receivers.

2. The device of claim 1, wherein the at least one local vehicle stereo control device comprises at least one switch located adjacent to a steering wheel of the vehicle that is originally electrically connected to the originally installed stereo receiver.

3. The device of claim 1, wherein the vehicle comprises a motorcycle and the at least one local vehicle stereo control device comprises at least one switch located adjacent to handlebars of the motorcycle.

4. The device of claim 1, wherein the stereo control interface device includes a memory and is programmable such that a programmer can sequentially store signals corresponding to the at least one local vehicle stereo control device such that subsequent activation of the at least one local vehicle stereo control device results in a corresponding signal being transmitted to the replacement stereo receiver.

5. The device of claim 4, wherein the stereo control interface device includes a wireless receiver and a wireless transmitter so that the stereo control interface device can receive a first wireless signal from a remote control and store a corresponding signal in the memory such that the stereo control interface device can recall the stored signal and thereby generate a wireless signal corresponding to the first wireless signal.

6. A stereo system for a vehicle comprising:
at least one local stereo control device adapted to send local control signals in a first format to an original stereo receiver to control the operation of the original stereo receiver;
a replacement stereo receiver adapted to replace an original stereo receiver, wherein the replacement stereo receiver is adapted to receive control signals in a second format to control the operation of the replacement stereo receiver; and
an interface device that is adapted to be positioned within the vehicle as an aftermarket product,
wherein the interface device is connected to the at least one local stereo control device so as to be able to receive the local control signals in the first format and, in response to receiving the local control signals, send output control signals in the second format via a hardwire. connection to the replacement stereo receiver so as to control the operation of the replacement stereo receiver such that the at least one local stereo control device can be used to control the replacement stereo receiver via the interface device,
wherein the stereo control interface contains in a memory output signals corresponding to the local vehicle stereo control device signals such that activation of the local vehicle stereo control results in the stereo control interface recalling from the memory at least one output signal corresponding to at least one of the local vehicle stereo control device signals and
wherein the stereo control interface is adapted for use with a plurality of different types of replacement stereo receivers.

7. The system of claim 6, wherein the at least one local stereo control device comprises at least one switch located adjacent to a steering wheel of the vehicle that is originally electrically connected to the original stereo receiver.

8. The system of claim 6, wherein the vehicle comprises a motorcycle and the at least one local stereo control device comprises at least one switch located adjacent to handlebars of the motorcycle.

9. The system of claim 6, wherein the replacement stereo receiver is adapted to receive wireless remote control signals to control the operation of the replacement stereo receiver.

10. The system of claim 9, wherein the interface device is adapted to be electrically coupled to the at least one local stereo control device and is further adapted to produce, in response to receiving the local control signals from the at least one local stereo control device, output control signals to the replacement stereo receiver corresponding to the remote control signals.

11. The system of claim. 10, wherein the interface device is programmable such that the interface device can be programmed to produce a first output control signal in response to receiving a first local control signal from the at least one local stereo control device.

12. The system. of claim 11, wherein the interface device includes a wireless receiver adapted to receive wireless remote control signals from a handheld remote control provided with the replacement stereo receiver.

13. The system of claim 12, wherein the interface device includes a wireless transmitter that is capable of transmitting wireless output control signals.

14. The system of claim 13, wherein the wireless transmitter and the wireless receiver comprise an infrared, transmitter and receiver.

15. A stereo control interface device adapted to be installed in a vehicle as an aftermarket product, wherein the device is adapted to
   be hardwire connected to at least one local vehicle stereo control device originally installed in a vehicle to control an originally installed stereo receiver responsive to signals in a first format,
   receive signals in the first format from the at least one local vehicle stereo control device,
   translate the signals in the first format to signals in a second format, and
   transmit output signals in the second format via a hardwire connection to a replacement aftermarket stereo receiver that is responsive to signals in the second format, wherein the replacement aftermarket stereo receiver is installed in the vehicle to replace the originally installed stereo receiver,
   such that the at least one local vehicle stereo control device originally installed in the vehicle can be used to control the operation of the replacement aftermarket stereo receiver via the stereo control interface device,
      wherein the stereo control interface contains in a memory output signals corresponding to the local vehicle stereo control device signals such that activation of the local vehicle stereo control results in the stereo control interface recalling from the memory at least one output signal corresponding to at least one of the local vehicle stereo control device signals and
      wherein the stereo control interface is adapted for use with a plurality of different types of replacement stereo receivers.

16. The device of claim 15, wherein the at least one local vehicle stereo control device comprises at least one switch located adjacent to a steering wheel of the vehicle that is originally electrically connected to the originally installed stereo receiver.

17. The stereo control interface device of claim 15, wherein the device is further adapted to wirelessly transmit output signals to the replacement aftermarket stereo receiver.

* * * * *